(12) United States Patent
Kashik et al.

(10) Patent No.: US 8,225,233 B2
(45) Date of Patent: Jul. 17, 2012

(54) ANALYSIS OF COMPLEX DATA OBJECTS AND MULTIPLE PARAMETER SYSTEMS

(76) Inventors: Alexey Kashik, Moscow (RU); Georgy Gogonenkov, Moscow (RU)

( * ) Notice: Subject to any disclaimer, the term of this patent is extended or adjusted under 35 U.S.C. 154(b) by 0 days.

(21) Appl. No.: 13/028,037

(22) Filed: Feb. 15, 2011

(65) Prior Publication Data

US 2012/0011474 A1    Jan. 12, 2012

Related U.S. Application Data

(60) Provisional application No. 61/362,595, filed on Jul. 8, 2010.

(51) Int. Cl.
G06F 13/00  (2006.01)
G06F 15/00  (2006.01)

(52) U.S. Cl. ........................................ 715/848; 715/850

(58) Field of Classification Search .................. 715/771, 715/783, 782, 757, 850–853, 763–765, 848
See application file for complete search history.

(56) References Cited

U.S. PATENT DOCUMENTS

2008/0288306 A1* 11/2008 MacIntyre et al. ............... 705/7
2010/0070904 A1*  3/2010 Zigon et al. ................... 715/771

* cited by examiner

*Primary Examiner* — Cao "Kevin" Nguyen
(74) *Attorney, Agent, or Firm* — Connolly Bove Lodge & Hutz LLP; Jonathan Jaech

(57) ABSTRACT

A computer facilitates multiple parameters data analysis by special visualization and navigation methods. Data to be analyzed is loaded from an external source the computer displays the data in response to user input using a variety of methods including data tables, slices of data spaces, hierarchically navigated data spaces, dynamic slice tables, filters, sorting, color-mapping, numerical operations, and other methods.

20 Claims, 20 Drawing Sheets

| DATE/PARAMETER | OIL EXTRACTION TOTAL | OIL EXTRACTION CUMULATED | ACTIVITY FUND OF INJECTION WELL | ACTIVITY FUND OF EXTRACTION WELL | LIQUID EXTRACTION CUMULATED | LIQUID EXTRA |
|---|---|---|---|---|---|---|
| 1999 | 3881.00 | 4516.40 | | 106.00 | 147.00 | 3089.60 |
| 2000 | 3496.40 | 6859.00 | | 107.00 | 149.00 | 6226.90 |
| 2001 | 3111.80 | 9201.60 | | 108.00 | 151.00 | 9364.20 |
| 2002 | 2727.20 | 11544.20 | | 109.00 | 153.00 | 12501.50 |
| 2003 | 2342.60 | 13886.80 | | 110.00 | 155.00 | 15638.80 |
| 2004 | 1555.40 | 15442.20 | | 113.00 | 166.00 | 18579.00 |
| 2005 | 1003.40 | 16445.60 | | 108.00 | 178.00 | 21131.50 |
| 2006 | 1167.50 | 17613.10 | | 143.00 | 218.00 | 24455.80 |
| 2007 | 1893.80 | 19507.00 | | 192.00 | 246.00 | 28663.00 |
| 2008 | 2264.90 | 21772.00 | | 236.00 | 267.00 | 33431.00 |
| 2009 | 2525.50 | 24297.00 | | 261.00 | 292.00 | 38657.00 |
| 2010 | 2707.10 | 27004.00 | | 291.00 | 323.00 | 43787.00 |
| 2011 | 2411.70 | 29416.00 | | 301.00 | 319.00 | 49130.00 |
| 2012 | 2048.70 | 31465.00 | | 307.00 | 324.00 | 54529.00 |
| 2013 | 1779.70 | 33245.00 | | 314.00 | 326.00 | 59805.00 |
| 2014 | 1520.20 | 34765.00 | | 316.00 | 334.00 | 64982.00 |
| 2015 | 1279.50 | 36044.00 | | 311.00 | 334.00 | 70044.00 |
| 2016 | 1080.10 | 37124.00 | | 302.00 | 323.00 | 74862.00 |
| 2017 | 919.20 | 38043.00 | | 297.00 | 314.00 | 79618.00 |
| 2018 | 766.10 | 38810.00 | | 292.00 | 310.00 | 84299.00 |
| 2019 | 636.90 | 39446.00 | | 284.00 | 305.00 | 88908.00 |
| 2020 | 545.20 | 39992.00 | | 279.00 | 296.00 | 93424.00 |

FIG. 15

ANALYSIS OF COMPLEX DATA OBJECTS AND MULTIPLE PARAMETER SYSTEMS

RELATED APPLICATION

This application claims priority pursuant to 35 U.S.C. §119 (e) to U.S. provisional application Ser. No. 61/362,595, filed Jul. 8, 2010, which application is specifically incorporated herein, in its entirety, by reference.

BACKGROUND

1. Field

The present disclosure relates to computerized system for visualization and analysis of complex data objects including multiple related parameters.

2. Description of Related Art

Various methods for dynamic visualization of object data using a computer are known in the art. As used herein, dynamic visualization refers to visualization of input data representing an object in an N-dimensional domain space, including displaying the object data in a window of a display screen as a model for the object in a three or two-dimensional subspace of N-dimensional space according to geometry of the subspace and the object itself, changing the object and viewing the changes in the window of the display. Such visualization may be useful for discerning details about the object's features based on the display and observable changes in it.

Another method for dynamic visualization of object data representing an object in N-dimensional domain space includes displaying object data in a window of a display screen as object's model in three-dimensional or two-dimensional sub-space of N-dimensional space according geometry of the sub-space and object, with alternation of data about object's geometry and displaying this alternation on screen. In this method, the display screen has at least one additional window for displaying of object data in another sub-space of N-dimensional space in addition to the first window. Alternation of visual representation in first window causes alternation of object representation in the additional window.

Notwithstanding the advantages of prior art dynamic visualization methods, these methods may suffer from certain disadvantages. For example, prior art methods do not permit visualization of a complex object characterized by data in the object's N-dimensional space as a whole. This deficiency reduces available information and the efficiency of information gathering. For further example, prior methods solve only visualization problems of limited scope, facilitating visualization and analysis of relatively simple systems only. In addition, known methods cannot perform visualization, numerical analysis of data values, and forecasts of development extrapolating into future data points for a multiple-object, multiple-parameter system.

SUMMARY

The present technology enables visualization and analysis of state and forecast of development of a multiple-object, multiple-parameter system. A computer is used to facilitate analysis and forecast of complex multiple-objects and multiple-parameters systems development by a human user. The computer displays information about the system on a display screen in the form of three-dimensional axonometric space with the mutually perpendicular axes, each being a respective one of an object axis, a parameter axis, and a time axis. The object-parameter-time space is referred to herein as a "data space" or data "cube."

The computer provides a user interface that enables control of the display and access to data by dividing the displayed data space by slices for each object, parameter, or time unit along the axes. The computer serves data slices in the form of tables, graphs, or diagrams in response to user interactions with a displayed data space, at a rate set by an analyst and not less than the maximum rate of acquisition of information for a human brain.

The computer also enables rapid navigation through related data spaces using predetermined hierarchical relationships between parameters and objects. For example, in response to user input selecting a first data point along one of the mutually perpendicular axes associated with a lower-order cubic data space, the computer may generate a display output depicting the lower-order cubic data space defined by the first data point and having three mutually perpendicular axes comprising a lower-order object axis, a lower-order parameter axis, and a time axis. Relationships between higher-order spaces and lower-order spaces are defined according to a hierarchy or related spaces. Also, in response to user input selecting a second data point along one of the mutually perpendicular axes that is not associated with a lower-order cubic data space, the computer may generate a display output depicting a two-dimensional data slice parallel to any two of the mutually perpendicular axes defined by the second data point. So the system provides two distinct kinds of navigating through a data spaces, depending on the status of the selected data axis; namely, whether or not the selected axis is related to a lower-order cubic data space.

In addition, the system enables analysis of any displayed data space by applying logical and mathematical operations to displayed values in response to user input. The visualization and analysis system also enables forecast of a data space's future development by extrapolation of features and properties visualized for past time points of the time axis into future time points.

A more complete understanding of the computerized system for visualization and analysis of complex data objects including multiple related parameters will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

FIGS. 15 and 16 are screenshots showing examples of a user interface for displaying and interacting with a 2-D data table including both numerical and graphical displays.

DETAILED DESCRIPTION

Figure 1A:
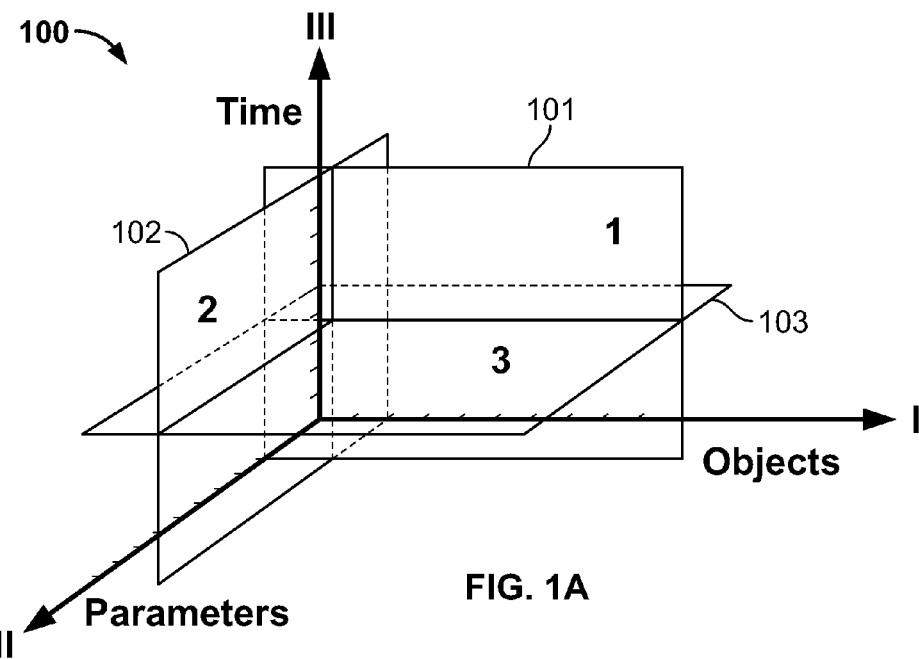
FIG. 1A is a perspective view of a conceptual three-dimensional axonometric data space with mutually perpendicular object, parameter, and time axes used for display of system data.
Figure 1B:
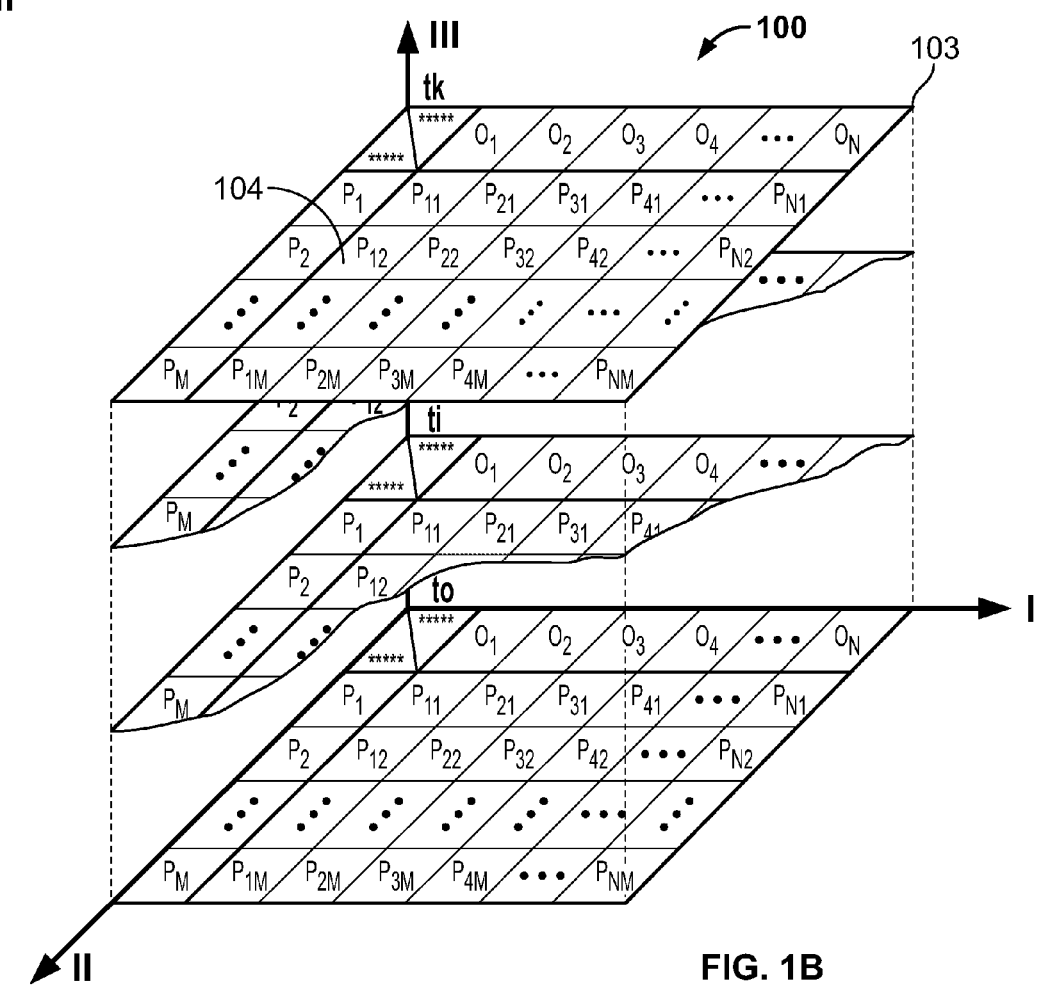
FIG. 1B is an alternative view of the data space display of FIG. 1, showing additional detail in discrete data planes.

In general, an interactive computer system is provided for presenting information from a data system in a figurative visualized form 100 on a computer display, as shown in FIG. 1. The display 100 uses a number of display dimensions not less than three realized in the form of 3D cube. The computer system places on respective axes (I, II, and III) of the cube data according to the following classifications: a list of the objects making system (an objective axis—I), a list of parameters for each object (a parametrical axis—II) and time (an event-time axis—III). The computer system enables selection of information for analysis—for example, extrapolated forecasts—performed by slicing the cube using data planes (slices) 101, 102 and 103 perpendicular to cube axes, each of which represents a table of numbers combined with color diagrams for data along the two axes parallel to the data plane. For example, the data plane 101 represents a slice or table for a single parameter, showing data for multiple objects and time values; the data plane 102 represents a slice or table for a single object, showing data for multiple parameters and time values; and the data plane 103 represents a slice or table for a single time value, showing data for multiple parameters and objects.

Figure 2:
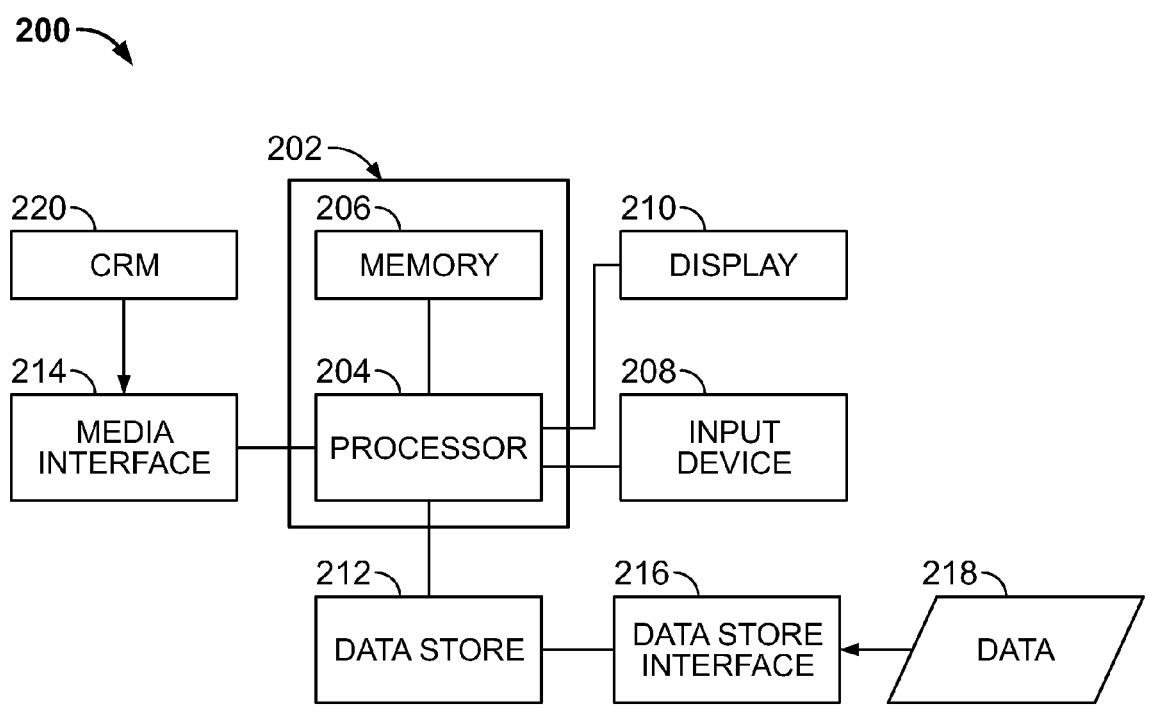
FIG. 2 is a block diagram showing elements of a computer system suitable for implementing methods as described herein.

FIG. 2 shows a stack of time slices 103 for the display 100. Each time slice includes multiple parameter values $P_{11} \ldots P_{NM}$ corresponding to the multiple objects $O_1 \ldots O_N$ and multiple parameters $P_1 \ldots P_M$. For example, the data value $P_{12}$ 104 is the value for the parameter $P_2$ or object $O_1$ at the time indicated at time slice $t_k$. It should be appreciated that the system allows corresponding slices perpendicular to the time slice 103 to be defined in a similar fashion. Viewing of the loaded numerical data may be realized using slices and 2-D windows. As used herein, a slice is a two-dimensional selection from a cube along one of three axes, and a 2-D window is a slice opened in the form of a separate window. A slice presented as numerical values in tabular form may be referred to as a slice table.

Thus, a data space with axes "Objects", "Parameters", "Time" is formed using the program and the loaded numerical data are transformed into a data cube. Each point of a cube has co-ordinates Object, Parameter, Time point (e.g., date or hour). In such a point the cube either contains a sign of absence of data, or has exact numerical value, which is the value of the parameter for the object for the indicated time.

Figure 13:
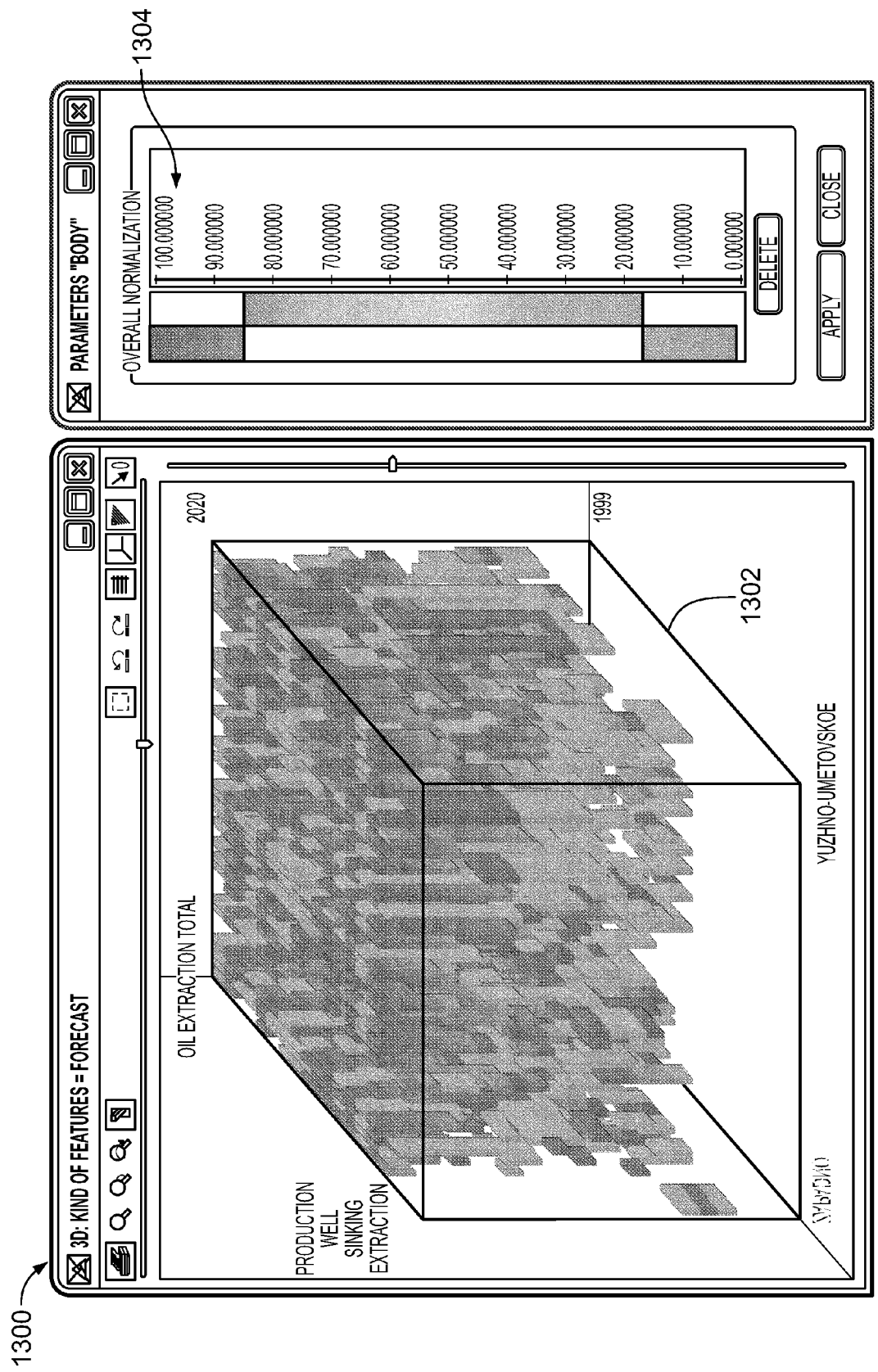
FIG. 13 is a screenshot showing an example of a user interface for controlling a color palette with a display of a multiple-object, multiple parameter 3-D data space.

As shown in the examples that follow, it is contemplated that when viewing a 3-D data space, the computer may display values as a color selected from a color spectrum occupying a corresponding region of space. An example of this form of display is shown in FIG. 13. FIGS. 1 and 2 are conceptual diagrams and are not intended to illustrate actual displays produced by the computer systems, although the system may be configured to generate such displays 100 if desired. Data may be represented by numerical values where it is possible (for example, in the slice table) and using color-mapping, that is using representation of numbers by the color selected from a palette of colors when displaying in graphical form.

Analysis of complex data systems as represented by FIGS. 1 and 2 is performed by executing various mathematical operations over slices tables. Slices are defined in response to user input, including for example either or both of keyboard or pointer input. The computer system may be programmed to respond to user input to model movement of a slice indicator along cube axes for data selection of one or more slices; addition, subtraction, division, multiplication or other operations for data contained in multiple selected slices; comparison of data in multiple slices; definition of relations of each slice to a slice for a defined time point; definition of relations in percentage in percentage terms; differentiation of slices with respect to time or other parameter; or other operations. A stack of slices (any two or more parallel slices) represents a data matrix, and operations may be performed on corresponding cells, or any useful matrix operation performed on the matrix defined by a slice stack.

Control of speed of feeding and perception of information at a rate comfortable for the researcher may be performed in response to user input, for example, in response to movement of a mouse or other pointing device. The system responds to user input to enable complex visualization independently of the type of the analyzed information by fast visualization of its parts in a table, graph or volumetric form. This enables the data researcher to construct an analysis on the basis of simple and intuitive approaches and procedures, providing near-immediate feedback to the researcher by data transformation with simultaneous visualization of the subject data.

FIG. 2 shows elements of a computer system 200 suitable for implementing methods as described herein. A computer 202 comprises at least a processor 204 coupled to a memory 206. The memory may hold program instructions that when executed by the processor cause the computer to perform steps of methods as described herein. The processor may comprise multiple processing components, for example multiple processing units or a central processing unit couple to a graphics processor and other processors. Any suitable single processor or combination of processors may be used. Multiple computers 202 working in cooperation may also be used.

The processor 204 may be coupled to a display device 210 via any suitable interface and connection as known in the art. The display device may receive a digital video signal from the processor 204 and use it to provide a computer graphical display using a LCD screen, CRT, projector or other display modality. The processor may further be coupled to an input device 208 or multiple input devices; for example, a keyboard, touchscreen interface, pointing device, camera, microphone, motion sensor, or other input device. The input device 208 acts as a transducer to convert physical input by a user into digital electronic signals for processing by the processor 204.

The processor 204 may be coupled to a media interface 214; for example, a media reader such as an optical disc drive, magnetic media reader or portable electronic memory interface. The media interface 214 may enable the processor to access data and/or program instructions encoded on a computer-readable medium 220; for example an optical, magnetic, or electronic medium.

System 200 is useful for processing massive amounts of data. As such, the processor 204 is operatively coupled to a data storage resource 212; for example, a data server or server farm, a cloud computing resource, or a data storage device. Data 218 may be added to the data storage resource 212 independently of processor 204 via one or more interfaces 216. In the alternative, or in addition, data provided to processor 204 may be added to the data store 212. External data 218 may be organized through a variety of methods. Typically, but not exclusively, data is organized in a relational database. However, data may be organized in any useful data structure and access to the data for the visualization engine 202 may be provided in any suitable manner.

As used herein, data is comprised primarily of parameter values, comprising, spatial, non-spatial, material and/or non-material characteristics of objects parameters. Each parameter value is associated with an object and with a parameter for the object, and with a time value, which may represent a time of measurement or recording of the value. The system enables the user to select a number and arrangement of researched objects depending on an object in view, for example, in the scope of the subject of the federation, company, deposit, branch of industry, and so forth.

Thus, data loaded into the system represents information on behavior of so-called objects in time. Objects may be various by nature depending on subject space. They may be, for example, goods, contracts of rent, wells, people, insurance policies, and so forth. Objects may possess classification properties not changing in time which are referred to herein as characteristics. For goods, for example, a characteristic may be an accessory to "group of the goods"; for wells, a characteristic may be a territorial arrangement, appointment; for people, a characteristic may be a nationality or gender. Stability of characteristics in time may not always be assumed, even for a nationality and a gender, and whether or not a value is considered characteristic may depend on the task at hand.

In comparison, as used herein, parameters refer to values that vary with time. For example, for an object of "goods" parameters may comprise "price", "quantity" and so forth; for wells, parameters may comprise "oil recovery", "load waters" and so forth; and for people, parameters may comprise "weight", "temperature", "salary" and so forth. Change of parameters for objects over time may be defined by additional data. For example, values of parameters of goods during different periods of time depend also on different locations where the goods are. Values of parameters of wells during various periods of time may be additionally defined, for example, by a reservoir from which the well extracts. Such additional data may be referred to herein as data attributes.

Both objects and parameters may be arranged on corresponding axes in various orders. For example, objects may be arranged in alphabetic order or on increase (decrease) of parameter values. Parameters may be arranged in an order defined in response to user input. Such ordering may be referred to as sorting.

Both for objects and for parameters it may be important to display them not in full list, but selectively, by various criteria. For example, a user may select goods relating to one group, or same-gender people. Or a user may select wells, which have extracted oil not less than a preset value, for the specified period of time. Such selections are referred to herein as filters.

Figure 3:
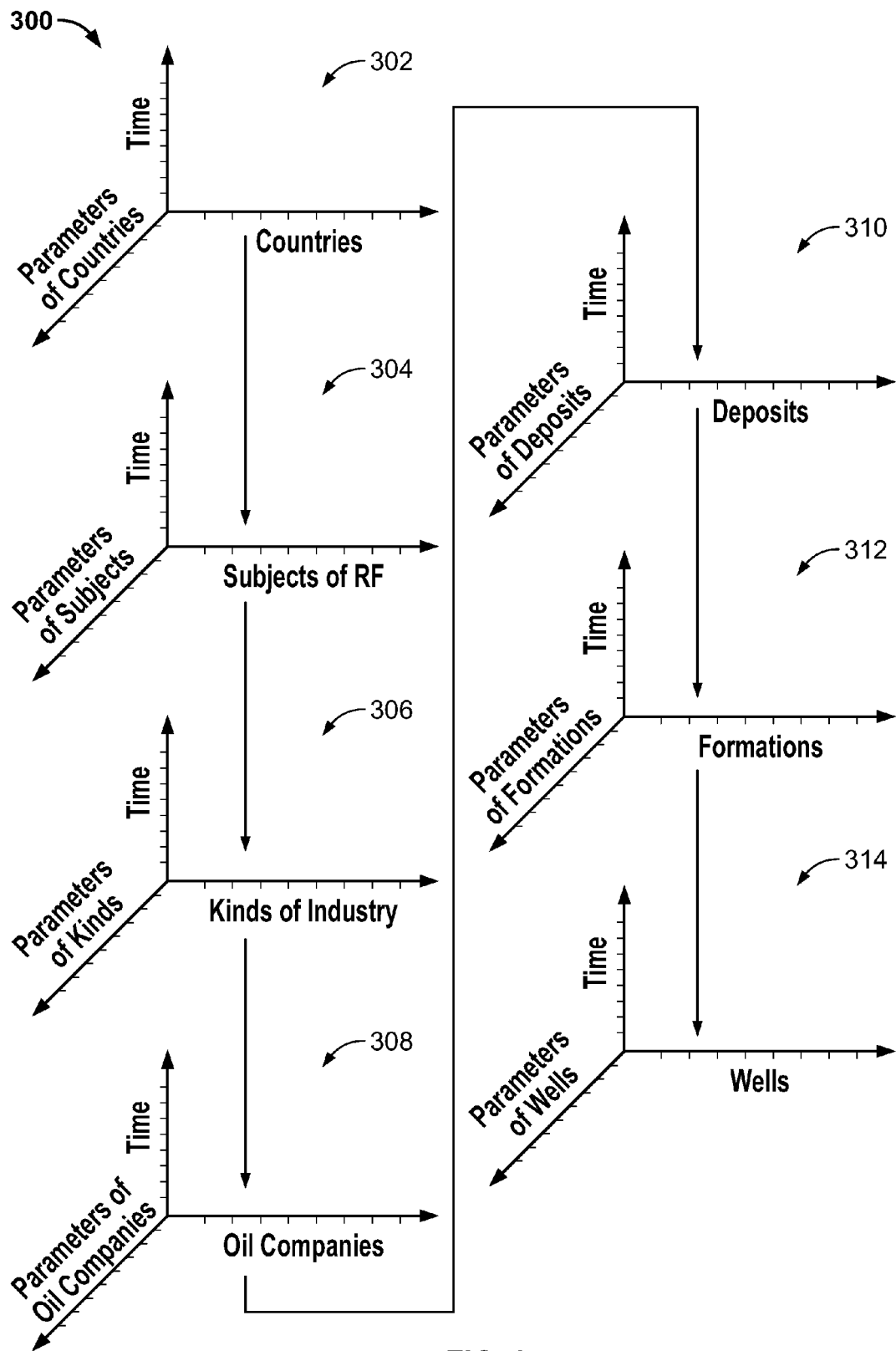
FIG. 3 is a conceptual diagram showing examples of a hierarchy of data spaces (lower-order spaces and higher-order spaces).

Objects may have a hierarchical relationship to one another. FIG. 3 is a conceptual diagram showing how the system may organize objects in hierarchies 300 that appear in various 3-D data space displays 302-314 of a data system. In each of the depicted examples the object axis is drawn horizontally, the time axis vertically and the parameter axis downward to the left. In a top-level data space depicted at 302, a high level object classification may comprise, for example, countries. Therefore the data space 302 may be displayed with a list of country identifiers along the object axis, labels for country parameters along the parameter axis and time values along the time axis. Data may by displayed in volumetric cells using a color coding scheme, as described more fully elsewhere herein. The top-level volumetric data space 302 is associated with a lower-order data space via the object axis. Selection of a point along the object access by user input amounts to selection of one of the listed objects, for example, a country such as the Russian Federation ("RF").

In response to the user selection of an object, the computer may generate a data slice perpendicular to the object access (e.g., a time-parameter table for the selected object), or provided that the object is associated with a lower-order volumetric data space, a new display of the lower-order space 304. Selection of one of these options (slice or lower-order volumetric space) may be determined in response to additional user input; for example, selection of a menu item prior to the object selection or activation of a designated control key on an input device while selecting the option. In the alternative, selection of the option may depend solely on the available data, for example, whether or not a lower-order volumetric data space is associated with and available for the selected object. In brief, the computer selectively displays one of the 2-D slice or the 3-D lower-order space in response to selection of an object, depending on at least one of additional user input or data available for the object.

The lower-order volumetric space 304 is populated by multiple objects that are included in the higher-order selected object from space 302. Here, for example, the selected country object "Russian Federation" includes multiple subjects (a.k.a provinces) within itself. Each of the plural subject objects is likewise associated with plural parameters in the lower order space 304. Generally, this sort of containment relationship between higher and lower order objects provides a logical basis for an object hierarchy, which is consistent for the examples shown in FIG. 3. However, the technology is not limited thereby; all that is required is that a plural number of lower-order objects be associated with each higher-order object in a hierarchy.

Generally, the number of possible object levels in a hierarchy is practically unlimited. Seven levels are shown in FIG. 3. Some or all of the subject objects in volumetric data space 302, for example, may be associated with a lower-order volumetric space 306 populated by plural industry type objects (e.g., oil, agriculture, steel making, etc.) having plural industry parameters. In turn, some or all of the industry objects in data space 306, for example, may be associated with a lower-order volumetric data space 308 populated by company objects having plural company parameters. Continuing the example, some or all of the company objects may be associated with a lower-order volumetric data space 310 populated by oil deposit objects having plural deposit parameters. Likewise, some or all of the oil deposit objects may be associated with a lower-order volumetric data space 312 populated by oil formation objects having plural formation parameters. Finally, some or all of the oil formation objects may be associated with a lower-order volumetric data space 314 populated by oil well objects having plural well parameters. Thus, FIG. 3 illustrates the enormous amount of data that can be rapidly navigated and visualized using hierarchically linked volumetric data spaces (e.g., spaces 302-314) together with the innovative use of the computer to selectively display one of the 2-D slice or the 3-D lower-order space in response to selection of a data point on an axis, depending on at least one of additional user input or data available for the data point.

Implementation in a Graphical User Interface

FIGS. 4-20 depict a variety of screenshots in a windowed graphical user interface (GUI) environment. However, the technology is not limited thereby, and the depicted screenshots are intended as examples to illustrate operation of the visualization and analysis methods, and do not limit the scope of the illustrated methods. The basic window generated by a computer 202 may appear as a standard window in a standard graphical user interface. For example, arranged at the top of a window there may appear a main menu comprising of "Operations", "Windows" and "Help". Under the menu there may appear a panel of tools, buttons of which duplicate points of the main menu. In response to targeting of a user input pointer on the button there may appear information (tool tip) regarding action, which corresponds to this button. In the center of the window there may appear a program "desktop", on which the windows opened during the work process may be arranged. In the bottom of the program window there may be provided a status bar and a bar displaying a course of performance of some operation.

Data Attributes Control

If data attributes described above are incorporated in the loaded data they have the fixed values at any moment of work with the program. These values may be changed. As used herein, additional non-numerical data on which values of object parameters during any period of time depend are understood as data attributes. For example, if a person's salary is a parameter for the person "object", and it is assumed that the person can work simultaneously in several offices, the organization paying the salary to the person may be understood as a data attribute. Another example of a data attributes is an indicator that may be applicable in many subject fields, indicating whether the given value of a parameter is actual or look-ahead.

The computer system may enable users to set values for data attributes in response to a menu command, keyboard command, or other user input. In the GUI environment, the system may cause a window (not shown) to be displayed on the client for setting data attributes. Such a window may display several lists, the number of which corresponds to the number of loaded data attributes. Each list contains two or more values for the corresponding attribute; for example, different employers for the same person as attributes for a salary parameter. Selection of the desired or current value of the attribute may be enabled by selection input from a pointing device or other user input indicating the desired value. In response to an attribute selection, the computer system may cause the selected attribute value to apply in all current and future data space displays.

Object and Parameter Tables

Lists of the loaded objects and their parameters may be viewed in windows containing corresponding tables. These tables may be generated by the computer system by applying selected filters to system data. That is, application of one or more filters by the system causes only such data as satisfies filter condition to appear in the generated tables. If filters are not applied all the data for a selected object-parameter pair and selected time may appear.

In an embodiment, the system may generate a window (not shown) to display tabular data with an interactive tools bar for providing user input. The window may include a heading a number of lines for the table, below which the table is displayed in row-column form. In response to selection of buttons from the tool bar or other user input the computer system may perform, for example, the following actions: printing of information content of the window, sorting of lines of the table, filtering of data according to user-defined filtering criteria and search in the table.

Hierarchical Filtering

As noted above, filters permit selection of a data subset for viewing or other processing according to some defined filtering criteria. A special case is filtering according to hierarchy, made possible because of hierarchical relationships between data spaces as described above. A hierarchical filter uses objects characteristics located in a certain order. Such order, as a rule, sets some classification of objects with various levels of hierarchy. For example, supposing the characteristic of deposits is in order of: 1. Federal district, 2. The oil company, 3. The subject of the Russian Federation, the system permits setting classification levels so as to first divide deposits on subjects of the Russian Federation, then on federal districts, and, at last, on oil companies.

It should be appreciated that values of object characteristics, distributed in a similar way, form a tree structure. Each branch of the tree represents a set of values of the object characteristics, and the branches are at different levels. The first level represents values of the first characteristic, the second level represent values of the first and second characteristic, and so forth. Selection of the unit can be used to set a filter condition. For example, selecting the second level from the example above for deposits sets the filter with a condition: Federal district="Privolzhsky" and the Oil company="Lukoil". This condition allocates a subset among all deposits with the selected criteria.

Figure 4:
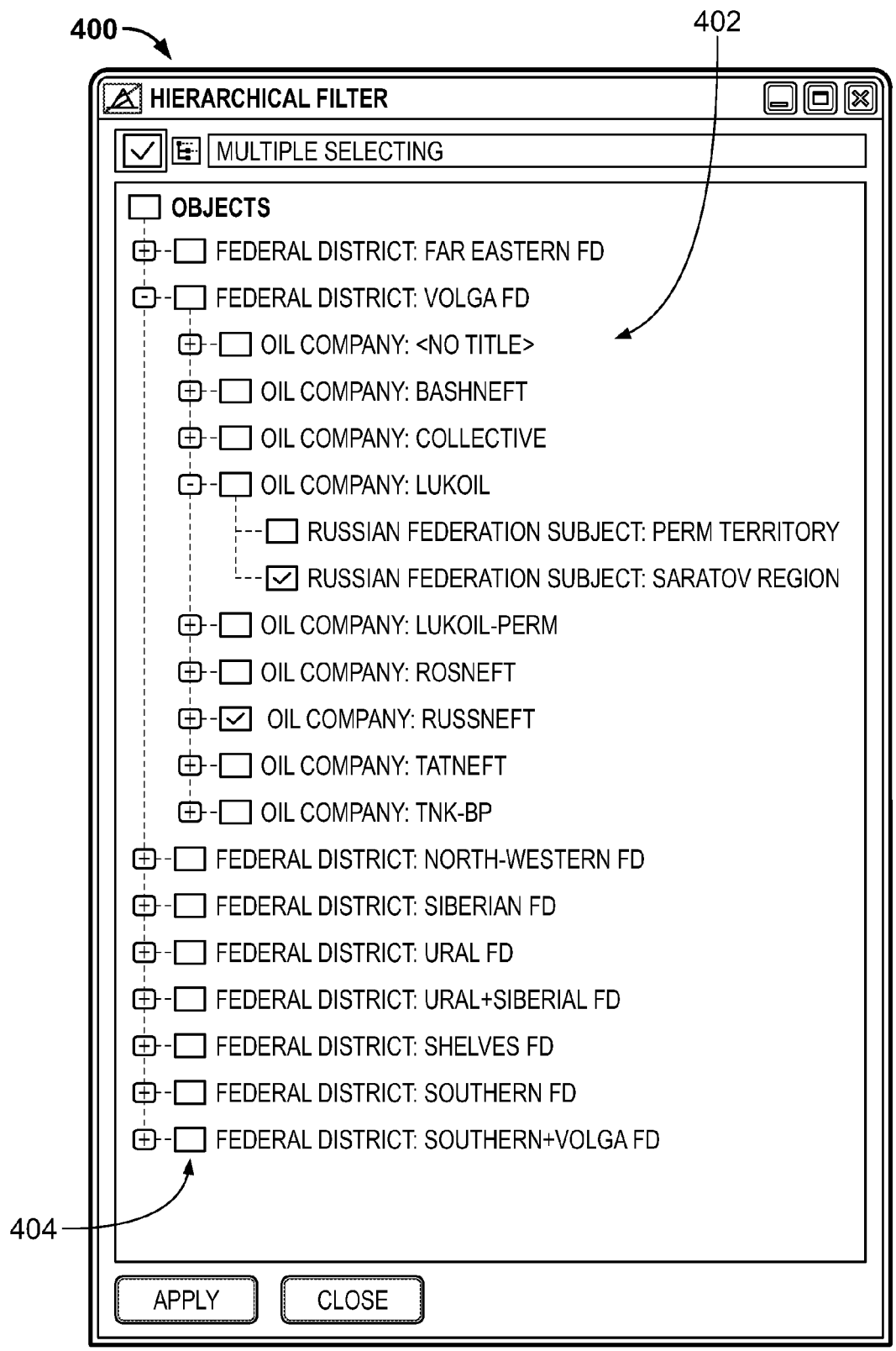
FIG. 4 is a screenshot showing an example of a user interface for selecting ones of hierarchically ordered object spaces for display.

To enable use of the hierarchical filter, the computer system may provide a hierarchical filter selection window 400, as shown in FIG. 4. The selection window 400 may comprise the filter tree 402 as described above. The window 400 may further comprise a button for changing an operating mode of the filter, a button for adjusting the filter and description of the current highlighted branch of a tree. The system may enable users to work with the filter one of two modes: simple and expanded. For switching between the two modes, the window 400 may comprise a button as shown at the upper left of the window.

In the simple mode of the hierarchical filter, the computer system enables user selection of only one unit of a tree. Such selection may be enabled, for example, by selection of a unit description using an input device, which the button "apply" in the lower left inactivated. Therefore, to set the filter, for example, <Federal district="Privolzhsky", the Oil company="Lukoil", the Subject of the Russian Federation="the Saratov region">, the user first navigates to the lowest-level unit "Saratov region" by opening the corresponding levels of the tree one after another, and then selecting the unit.

In the expanded mode, the computer system enables user selection of several units of a tree. The tree window 400 in this case contains a selection box near each unit for selection, as shown in the depicted tree 402. Thus, several units even of various levels may be selected at the same time. Having selected necessary units by a mouse click in a window near them, and, having pressed the button "To apply", the computer system responds by setting the filter to the selected units.

The structure and order of the object characteristics defining the structure of a hierarchy (tree) may be automatically configured at an initial step of data loading. The initial configuration may be changed using an interactive window (not shown) for adjustment of the filter which the systems may open in response to user input. An adjustment window may comprise, for example, a list of characteristics of objects according to the initial or current configuration. The arrangement and ranking of items in the hierarchy may be changed in response to user input, for example, by simple dragging of a mouse or other pointing device. In addition, the system may enable addition or removal from a displayed list in response to selection input. For example, to add the characteristic to a list a user may select it in a left part of a window and to then press a button ">>" to move it to the right; conversely, to remove the characteristic from the list it a user may select it in a list located to the right part of the window and then press button "<<" to move it to the right.

Parametrical Filtering

Figure 5:
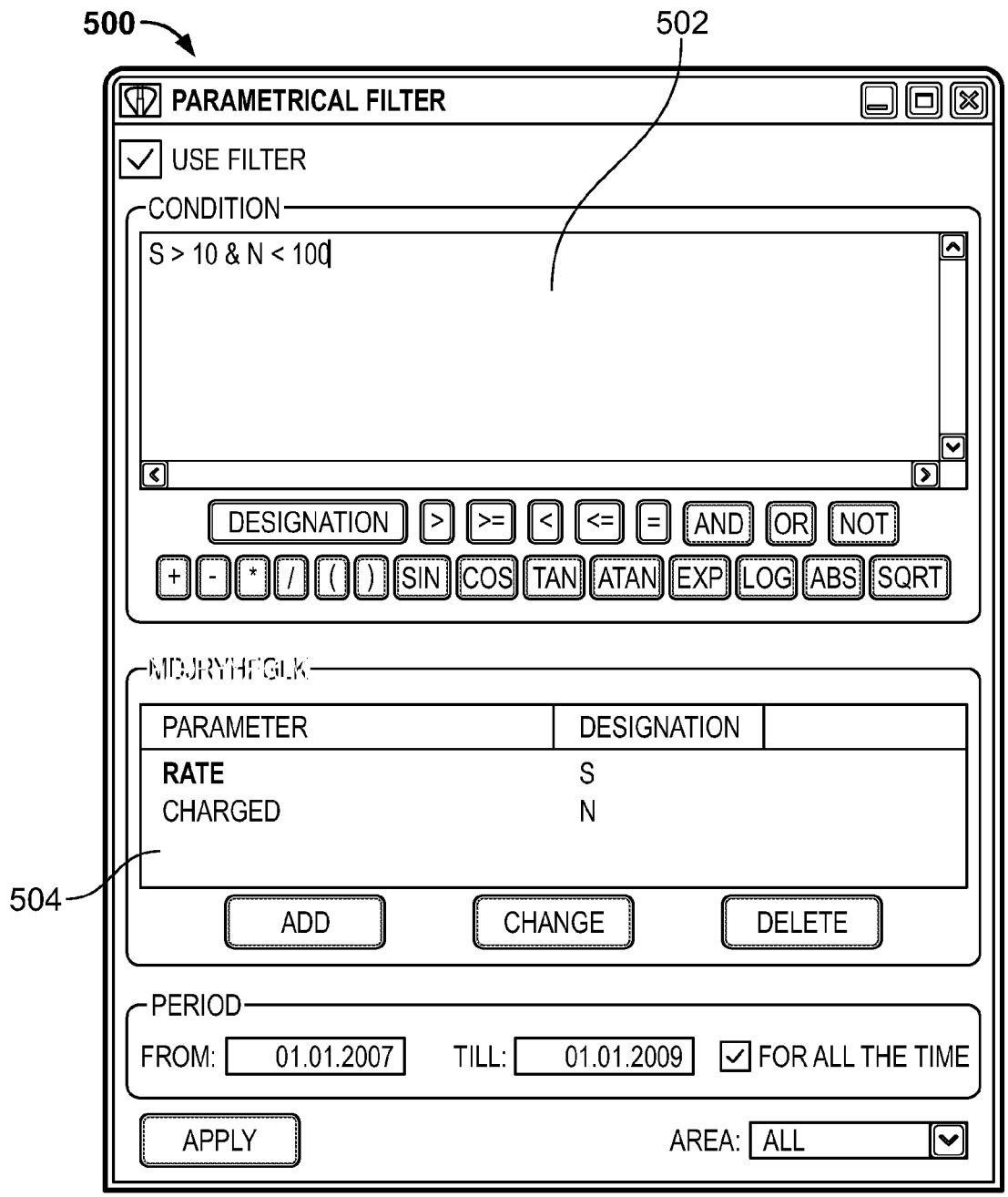
FIG. 5 is a screenshot showing an example of a user interface for setting parameters of a numerical filter to be applied to a data display.

Parametrical filtering allows making data selections of objects in response to parameter values. For example, the system enables users to select objects for which a selected parameter does not exceed a defined value. The user may also specify the scope of data to which the parameter filter should be applied, for example, to data for one or more periods of time. The parametrical filter may be controlled using a parametrical filter window 500 as shown in FIG. 5, which may be opened in response to user command input.

In an upper part 502 of this window a command button "Use filter" may be provided as a toggle input to indicate whether the parametrical filter should be switched on or off. The window 500 contains a section of conditions of the filter, the list of designations of the parameters used in a condition, a time period and a filter scope in the selection period.

The condition may be set by expression input, for example:
the designations of parameters listed;
grouping parentheses;
comparison operations > (more), < (less), =(equal), >=(more or equal), <=(less or equal), < > (not equal);
logic operations: & (and); | (or), not (negation), defined (data presence);
arithmetic operations + (addition), − (subtraction), / (division), * (multiplication);
functions sin, cos, tan, atan (arctangent), exp (exponent of e), log (logarithm base e), log10 (logarithm base 10), abs (absolute value), sqrt (square root).

The system may enable addition of a new designation via a button "Add" as shown, for example, under the list of designations in the lower portion 504 of window 500. In response to "Add" input, the system may generate a second input window (not shown), enabling the user to specify a line-designation of a parameter it is desired to add and to select the parameter from a list. Likewise, the system may enable changing or removing parameters, for example via the depicted input buttons "Change" and to "Remove", enabling the user to change a designation of parameters or to select other parameters for a designation and to remove a designation from the list.

Under the condition entry field 502, buttons facilitating input of a condition may be provided. The buttons may be configured such that button selection causes the system to insert a corresponding operation into the text editor at the present cursor location. In addition, the window 500 may include a button, for example, one labeled "Designation," configured such that selection of the button will cause the system to allocate the necessary line in the list of designations.

An applicable time period may be selected by indicating a beginning and end time, as shown at the bottom of window 500. If the mode "For all time" is switched on, the values of the beginning and the end may be ignored and the parameter condition will be applied regardless of time period.

The window 500 may further comprise an area or action field for selecting one of two values "All" and "At least one," as shown at lower right. In the first case (All), all of the objects for which the condition is carried out will readout. In the second case, the presence of at least one readout will be enough. The "Apply" button at lower left may be used to indicate acceptance of a displayed condition, to which the system will response by applying the indicated conditions to selected data.

Geometrical Filtering

If the loaded information for objects contains their location coordinates, the system may enable application of a geometrical filter. The geometrical filter allows selecting those objects, which coordinates are within a defined boundary or are in nodes of a broken line.

Figure 6A:
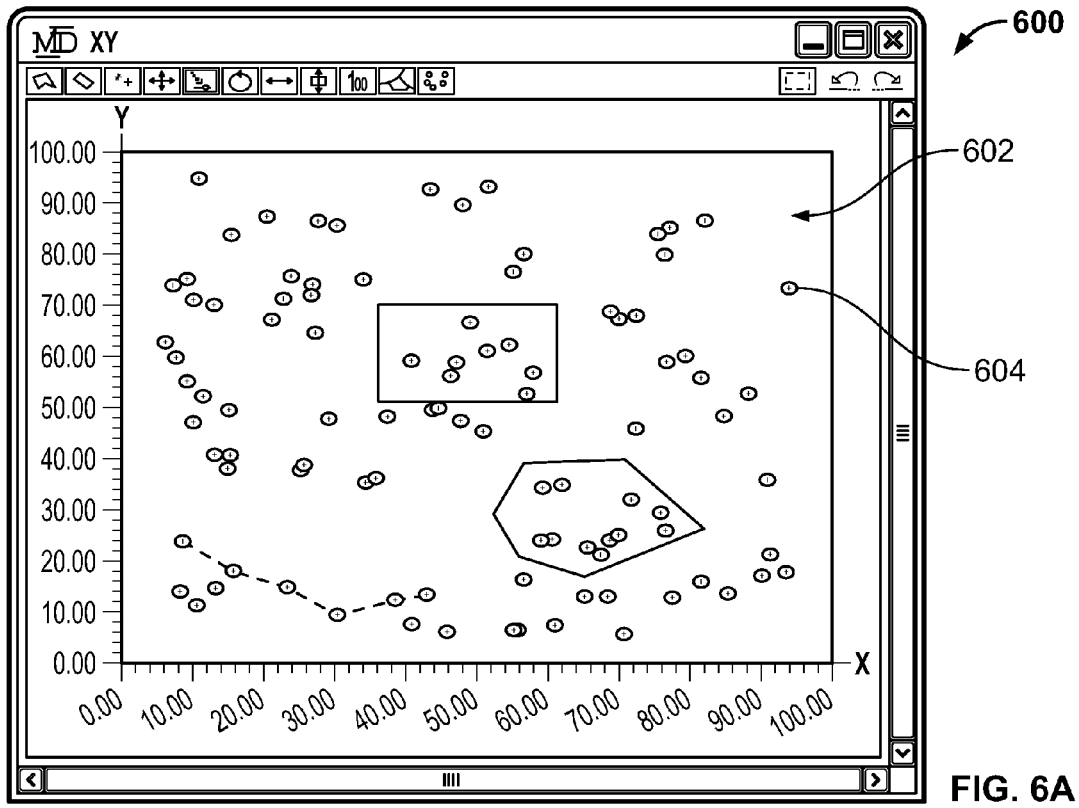
FIGS. 6A-B are screenshots showing examples of geometric map tools for object selection.

In response to user input selecting a geometrical filtering function, the system may generate a window interface 600, as shown in FIG. 6A. This window 600 may include a region 602 depicting a window of 2-D space with numerical axes X and Y. Objects, e.g., the indicated object 604 may be displayed as points in the 2-D space 602, according to their coordinates. The system may display only those objects, for which conditions of other filters are satisfied.

The window 600 may comprise a shortcut menu bar, including an option "Search object", which is related to the concept of slice in a 3-D window and will be considered later. In the top of the window 600, buttons of a tool bar for the window may be arranged. These will be described in detail by way of example, and not of limitation.

The first three buttons at the left of the upper tool bar allow drawing the various figures setting the filter. The buttons may be used to call closed broken line, rectangle and, so-called profile operations, respectively. As used herein, a profile means a broken line, on which the nodes thereof represent objects in the data hierarchy. To draw a figure, a user may select a corresponding button and make the certain action using a pointing device. For example, to draw a rectangle a user may select the corresponding button and move a mouse from one node of the future rectangle to the opposite node on a diagonal. To draw a closed broken line, a user may select this tool and draw at first a piece connecting two its nodes, and then, grasping its any side with the mouse to move the mouse breaking thereby a side and creating a new node.

When releasing the mouse the figure, representing a boundary or profile, is automatically added into the geometrical filter. Removal of a figure from the filter may be performed by selecting an option "Remove" in its shortcut menu bar. Selecting a figure and clicking a right mouse button (or other selection action) may be used to open the shortcut menu bar for a drawn boundary or profile.

The following four buttons on the tool bar may be used for changing, rotating and moving all figures, except a profile. To change of the size of drawn boundary figure, a user may select a corresponding button (the first of the four) and move the figure nodes and edges grasping them with a mouse. Using the following button a user may create new nodes in the closed broken line. The following button allows rotating a figure, and the last allows moving it. In response to moving, rotating or changing the sizes of a figure the geometrical filter may be automatically updated.

The eighth and ninth buttons on the tool bar of the geometrical filter serve for changing of the center of rotation of figures and switching on/off the mode of display of objects' names, accordingly. The last two buttons open a window of options for associating of images with the geometrical filter and a window of options of objects display, accordingly.

Figure 6B:
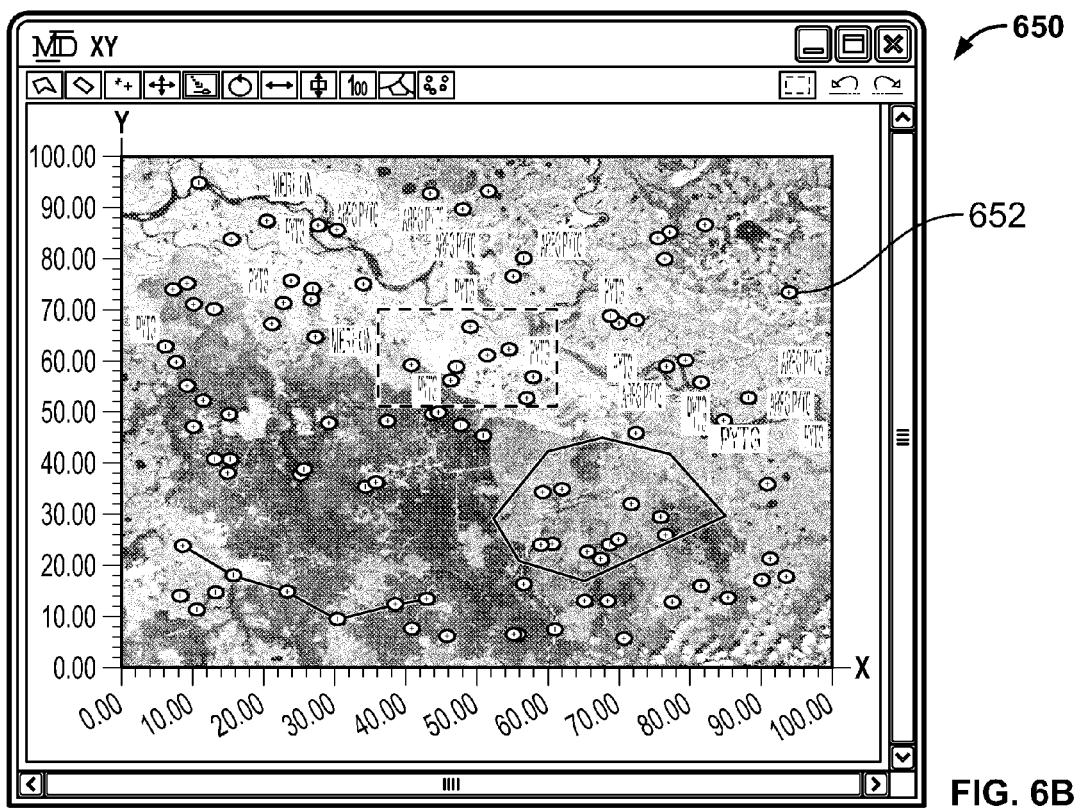

Associating of the image with the geometrical filter may be performed to help the user to orientate in an arrangement of objects better. For this purpose some image is selected as a background for objects, for example, it may be a district map. The image should be stored as a graphic file of one of commonly used formats, for example, JPEG or BMP. The resulting window 650 may appear as shown in FIG. 6B, with drawing and selection features as described above for FIG. 6A The position and size of the map image 652 may not correspond to co-ordinates of the objects, at least because they may be received from different sources. To bring them into accord, the associating of a map, which is made as follows, is carried out.

When the associating window (not shown) is opened, in the window of the geometrical filter there is an image of three special points. By default they are located in top left, bottom left and bottom right window corners. If necessary these points may be moved by preliminary pressing the button "Moving of an associating point" in the associating window. It is also possible to change the color of these points by setting the components of color RGB using cams in the associating window. The given points set three points on the map. After pressing the button "The map associating" in the associating window, moving of associating points using the mouse leads to occurrence of points of their new positions, which then may be moved independently.

3D Data View

Figure 7:
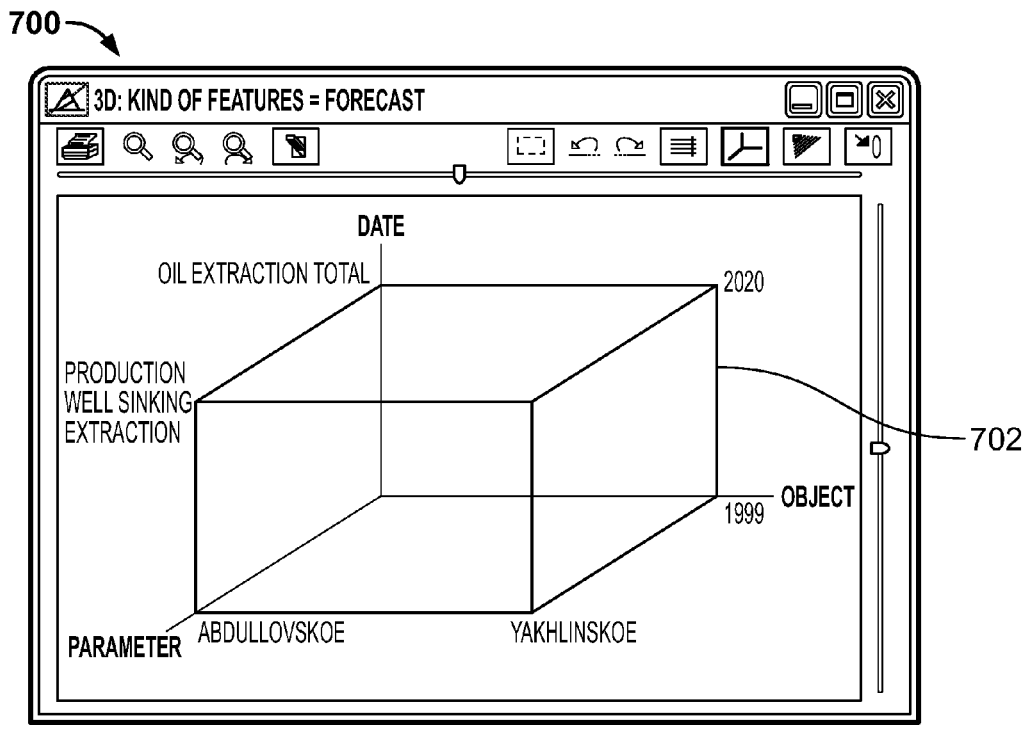
FIG. 7 is a screenshot showing an example of a user interface for setting up a data forecast analysis.

One of the methods for visualization of the loaded data is its viewing in a window 700 of a 3-D cube 702, as shown in FIG. 7. In the central part of the window 700 there is the cube image 702, and in the top part there are buttons for a tool bar of the window. Just over the image of the cube and to the right of it a button for a zoom feature is located. In the heading of the window the values of attributes of the data established at the moment are displayed. Four buttons on the tool bar of the windows located to the right of the print button are intended for "Drill down" option and will be considered later.

The cube image contains three axes of space corresponding to quadruple of parallel edges. The axis "Object" corresponds to horizontal edges of a cube (in its standard arrangement), an axis "Parameter" to edges on diagonals and an axis "Date" or "Time" to vertical edges. The objects selected using the current filter and sorted according to current sorting may be located on the axis "Object". On the axis "Parameter" the parameters of objects selected using the filter and sorted in an order, defined by the user may be located. At edges of each of axes designations of their first and last elements may be displayed.

On an axis "Date" the time period, for which the data is loaded, may be located. This period may be changed as desired. For example, a user may select the main menu option "Windows.Filters.On date/time", to indicate initial and final date of the period in the opened window.

The system may enable a user to change the type of a projection in the window using a command button "Projection" and to switch off the display of inscriptions to axes by using a command button "Inscriptions".

The cube 702 may be rotated in two ways. First, round its center. For example, a user may select the button "Rotation of top of a 3D-cube" of the tool bar of the window of the program and, "having seized" the nearest top of a cube with the mouse to move the mouse in the necessary direction, causing the computer to rotate the view in response to the user input. Secondly, the cube 702 may be rotated around each of its central axes. For example, a user may select the button "Rotation of an axis of a 3D-cube" and move one of three nearest edges of a cube with the mouse, causing the computer to rotate the view in response to the user input. The system may enable a user to return the cube in initial position by activating a button "Drop" in the right top part of the tool bar of the window of the cube.

Enlargement (zooming) in a 3-D window may be performed in response to user selection of a button "Window Part" on the tool bar of the window of a cube and the subsequent allocation of the rectangle on any side by the mouse. After releasing the mouse the highlighted rectangle may become a visible part of this side.

For navigation by "the dropped out of sight" part of the cube a user may click the button "Slice moving" on the tool bar of the window of the program and to move a black strip on the cube edge, which displays position of a visible part, having grasped it with the mouse. To return to the previous condition of a 3-D window in the zooming sequences a user may select the button "Cancel" in the tool bar of the window of the cube and to click the button "Return" to switch to zooming again.

Control of Data Slicing

Figure 8A:
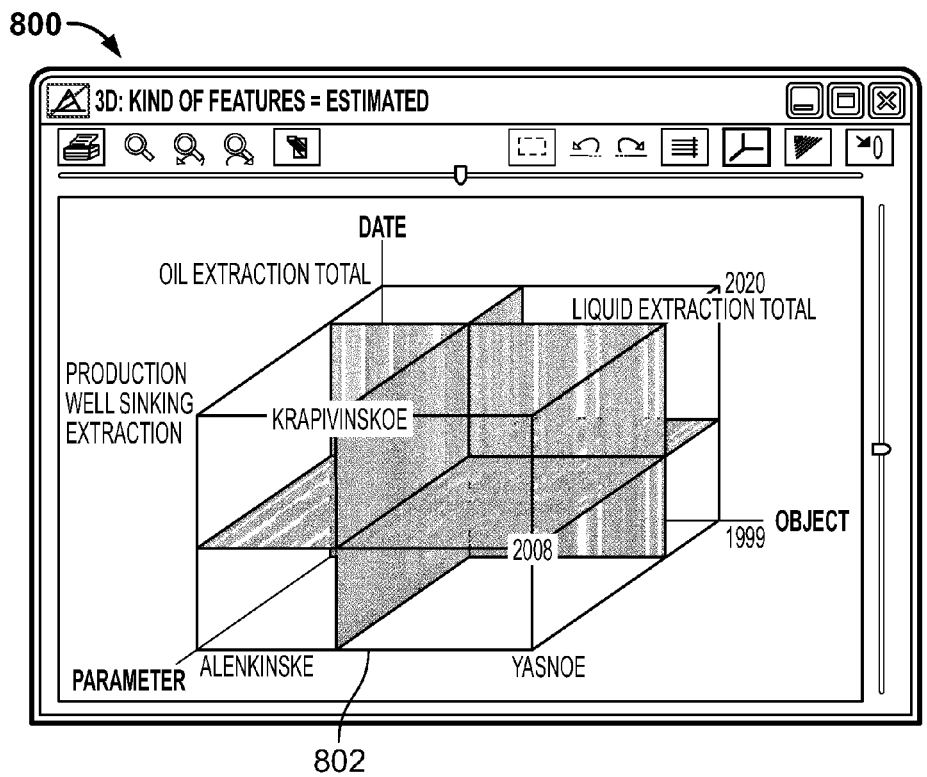
FIGS. 8A-B are screenshots showing examples of output from a data forecast operation and user interface for display of the output.
Figure 8B:
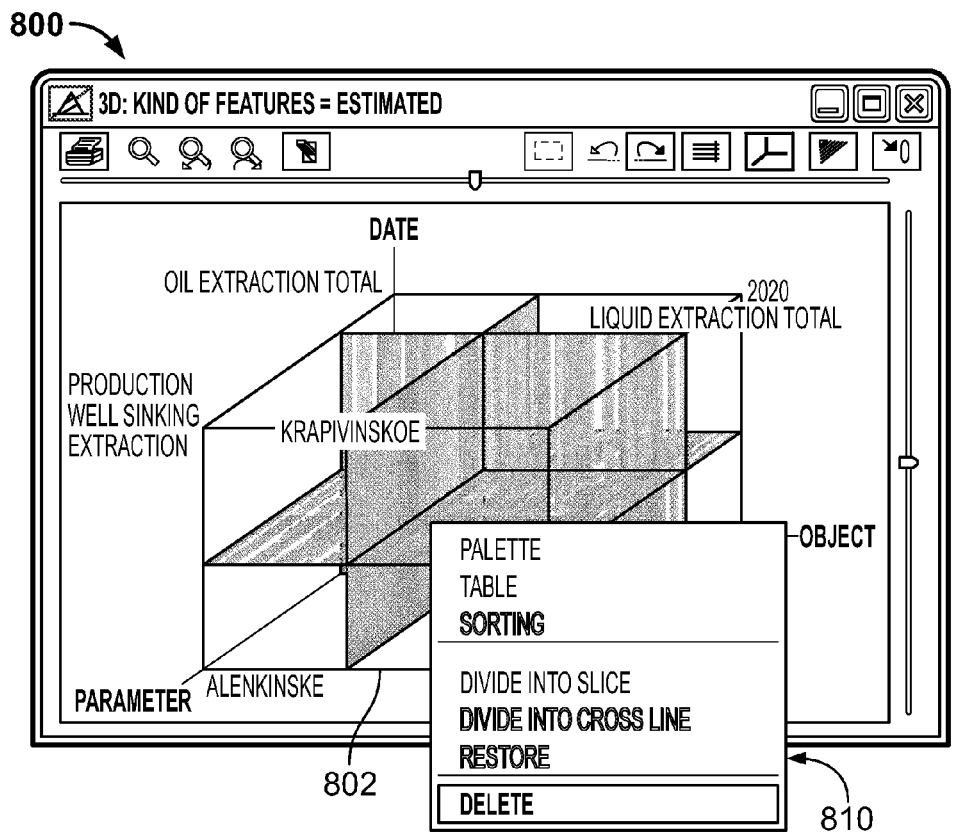

Data viewing in a cube may be realized using 2-D cross sections (slices), for example as shown in window 800 of FIGS. 8A and 8B. To set a slice a user may first select the button "Creation of regular cross-section" on the tool bar of the program and to "brush" on the nearest edge of the cube 802, which should cross the cross-section, with a mouse or other pointing device. To move a defined slice, a user may select a tool button "Cross-section move" on the tool bar of the program, to grasp and move the slice using a left button of the mouse or other selection input. The button "Cross-section move" may be automatically switched on after creation of a new slice.

For each position of the slice, in the point of its intersection with the edge nearest to the point of view, the corresponding value may be displayed on an axis. The system may enable deletion of the slice in response to selection of a corresponding option on a shortcut menu 810 bar "Delete", after having selected the slice the necessary option in the appeared menu.

For any figures displayed in a 3-D window and particularly for the slices, the system may enable an operation of cutting off of a part of one figure by another. This operation may be performed in response to capture with the right button of a pointer and throwing of a cutting figure on a cut part of the other figure. Therefore, to cut a part of the slice by another slice a user may throw one slice on another. Cancellation of cutting off may be performed in response to a repeated throw of the cut object on visible yet part. A cutting off operation is used for viewing a part of a figure covered by another figure.

If the window of the geometrical filter is opened and the operation of touching with the mouse may be performed on 3-D slice windows than the relevant object or objects may be highlighted in the window of the geometrical filter. In addition, for imaging of objects in the geometrical filter the system may provide an operation of search of object, which means the slice setting on an axis of objects in exact value. For this purpose a user may specify which slice will be controlled by this operation, to associate the slice with the geometrical filter. The indication of a slice may be made by throwing or dragging onto on a window of the geometrical filter. In response, the object on which the slice is set may be immediately highlighted. To set the slice on another object a user may select the option "Search object" of shortcut menu bar for this object image in a window of the geometrical filter. If the slice is not associated with the geometrical filter or the object image is not included into the preset filter, the said option of the menu may be made inaccessible.

Data Color Mapping

Slices may be used to display numerical data using color mapping to map numerical values to different parts of a color spectrum. For example, in window 800 shown in FIGS. 8A and 8B, data is displayed in slices using different colors. As noted above, each point of a cube has coordinates Object, Parameter, Time. Therefore, in each point of a cube we have a number, which means value of Parameter for Object on Date or Time. For example, value of an oil recovery for a deposit YASNOYE in 2008, or temperature of patient Ivanov in the morning on Jan. 20, 2002. To provide a graphical display of a collection of data, numerical values should be represented using some visual graphics feature. Therefore, in certain graphical displays the system displays numerical values using color.

The system may apply a defined rule for selecting of the color for values of a cube, for example as follows. The palette, in which the colors are distributed between minimum and maximum values of a cube, may be fixed. Further, for any value of a cube the relation, in which it is between minimum and maximum values, is defined and the color may be selected proportionally.

Figure 10:
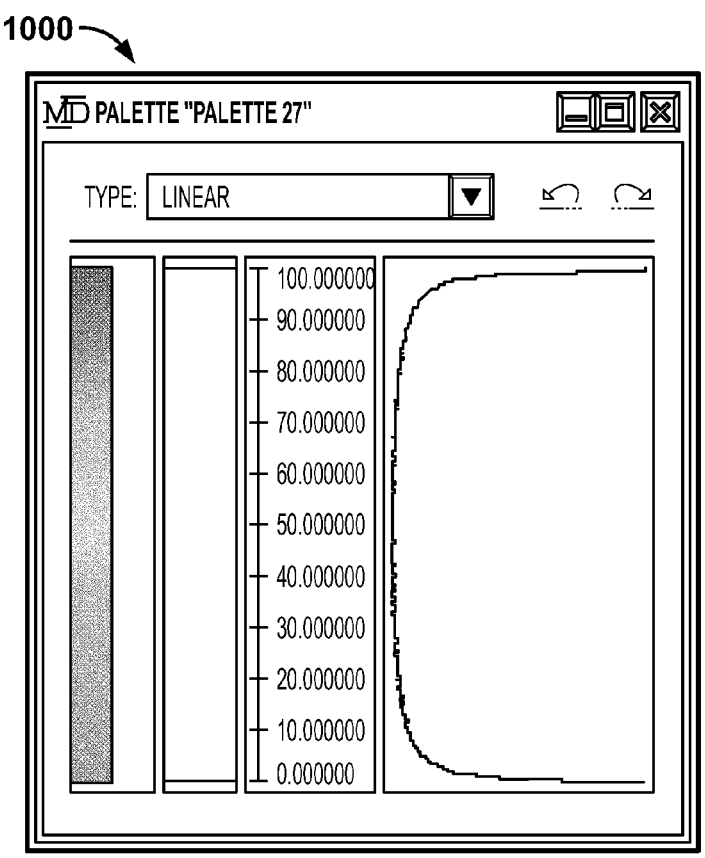
FIG. 10 is a screenshot showing an example of a user interface for selecting a color palette for display of data values.

This palette may be seen when opening the window 1000 of a palette using a corresponding option "Palette" of a shortcut menu bar of a slice or other user input, as shown in FIG. 10. Distribution of colors between minimum and maximum values of parameters is displayed in this window 1000. The graph to the right of the palette represents frequency of value in a range. The element "Type" may allow user selection of a scale type "Linear" or "Logarithmic". In the second-to-left column of the window 1000 there are located the borders of the palette on the extreme left, which may be changed for example in response to pointer movement and selection input, or numerical values input via a shortcut menu bar. The system may enable returning these borders to default minimum and maximum values in response to user input. The system may also enable data filtering in the palette window by "cutting out" value intervals from the palette using mouse or other pointer input.

The rule of color-mapping described above is non-specific to the sense or quality of the data, because the cube contains values different in sense and units of parameters measurements. In this case the minimum value of a cube may be, for example, the number of wells, and the maximum one may be the oil recovery. That is why several rules of color-mapping distinct from a default or standard may be provided.

Selection of the color mapping rule may be made in a corresponding window (not shown) in response to user input. The window may contain a list of methods for encoding of a cube values with color registered in the program. To change the rule of encoding may allocate the corresponding line in the list. All the encoding rules, except the first one, may be normalized. That is, before a color selection a cube value may be replaced with percent between minimum and maximum. Two types of normalization may be provided: upon parameters and upon objects and parameters.

Normalization upon parameters means that the minimum and maximum values are defined for each parameter separately. For example, if the cubed minimum value of weight of one person is 50, and the maximum value of another one is 100, and the minimum temperature of one person is 36, and maximum one of another is 40 than the first person's weight 75 and the second person's temperature 38 will be replaced by value of 50% in both cases. Such method of normalization allows comparing different objects with one another for all parameters.

In the window of color-mapping selection the system may provide a mode "Normalize within the filter". In this mode, in the case of normalization upon parameters the minimum and maximum values are calculated only among the objects that satisfy filter conditions. This mode may be entered for viewing the objects with minimum and maximum values at data visualization.

Normalization upon parameters and objects means that the minimum and maximum values are defined for each parameter and each object. For example, if the minimum value of weight of one person is 50, and the maximum value is 100, and the minimum temperature of another person is 36, and the maximum value is 40 than the first person's weight 75 and the second person's temperature 38 will be replaced by value of 50% in both cases. Such method of normalization allows considering of data behavior independently of the object or parameter.

The second and third rules in the list of color mapping rules mean the above-mentioned normalizations are applied to the initial data of a data space. Four subsequent rules are two normalized variants of the data rate of change. In the fourth and the fifth rules rate of change is understood as an increment of values of a cube on a date axis, that is differences of values between the following and current dates are normalized. And in the last two rules rate of change is understood as the logarithm of the relation of values for the following and current date.

Obtaining Information from a Slice

Figure 9:
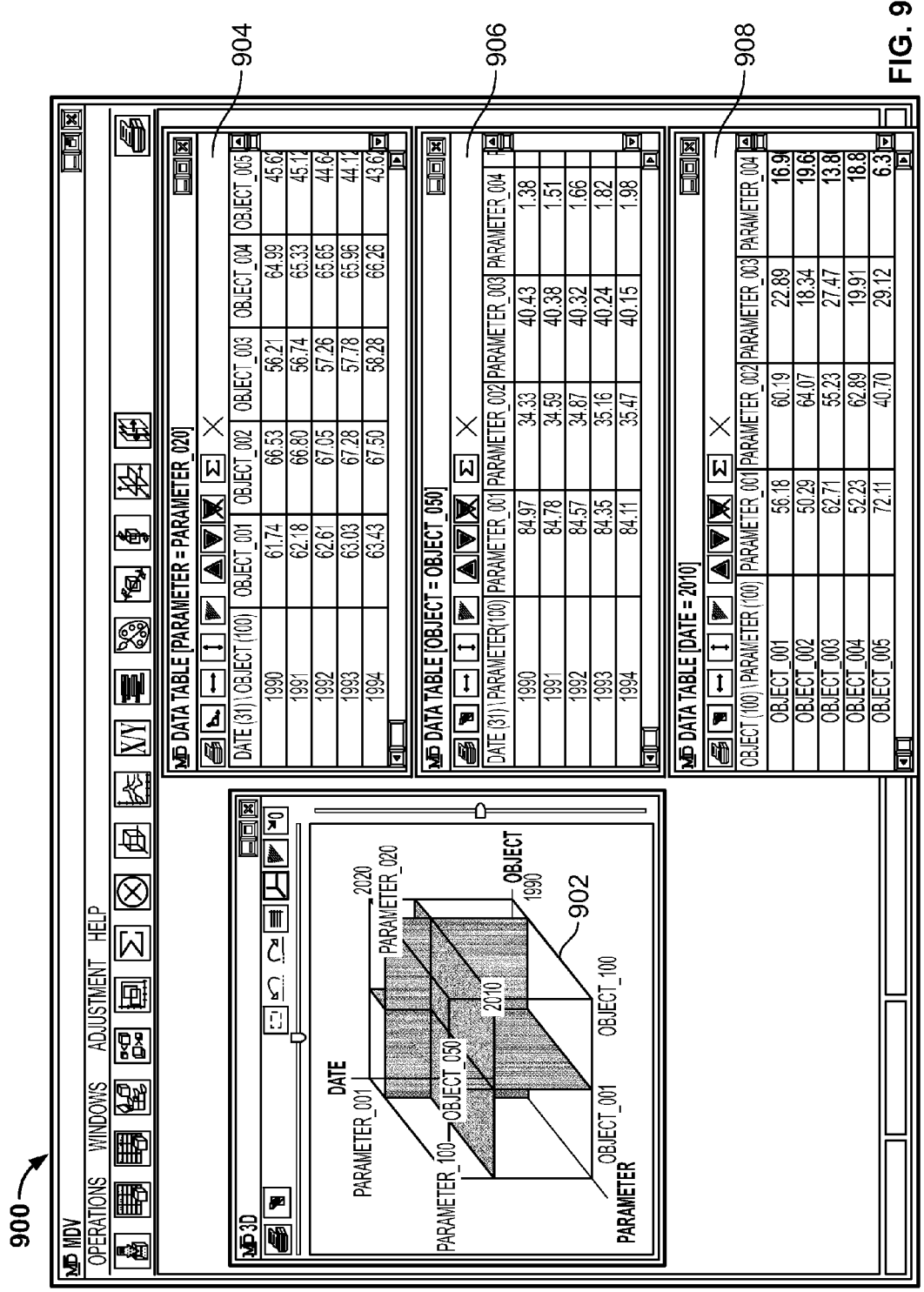
FIG. 9 is a screenshot showing an example of a user interface for selection and display of data slices and slice data in tabular form.

As the color mapping enables estimation of data character mainly qualitatively, the system may display information on real values of numerical parameters in separate points of visualization windows. For example, in window 900, slice data is presented numerically in the separate data tables 904, 906, and 908, as shown in FIG. 9.

Figure 11:
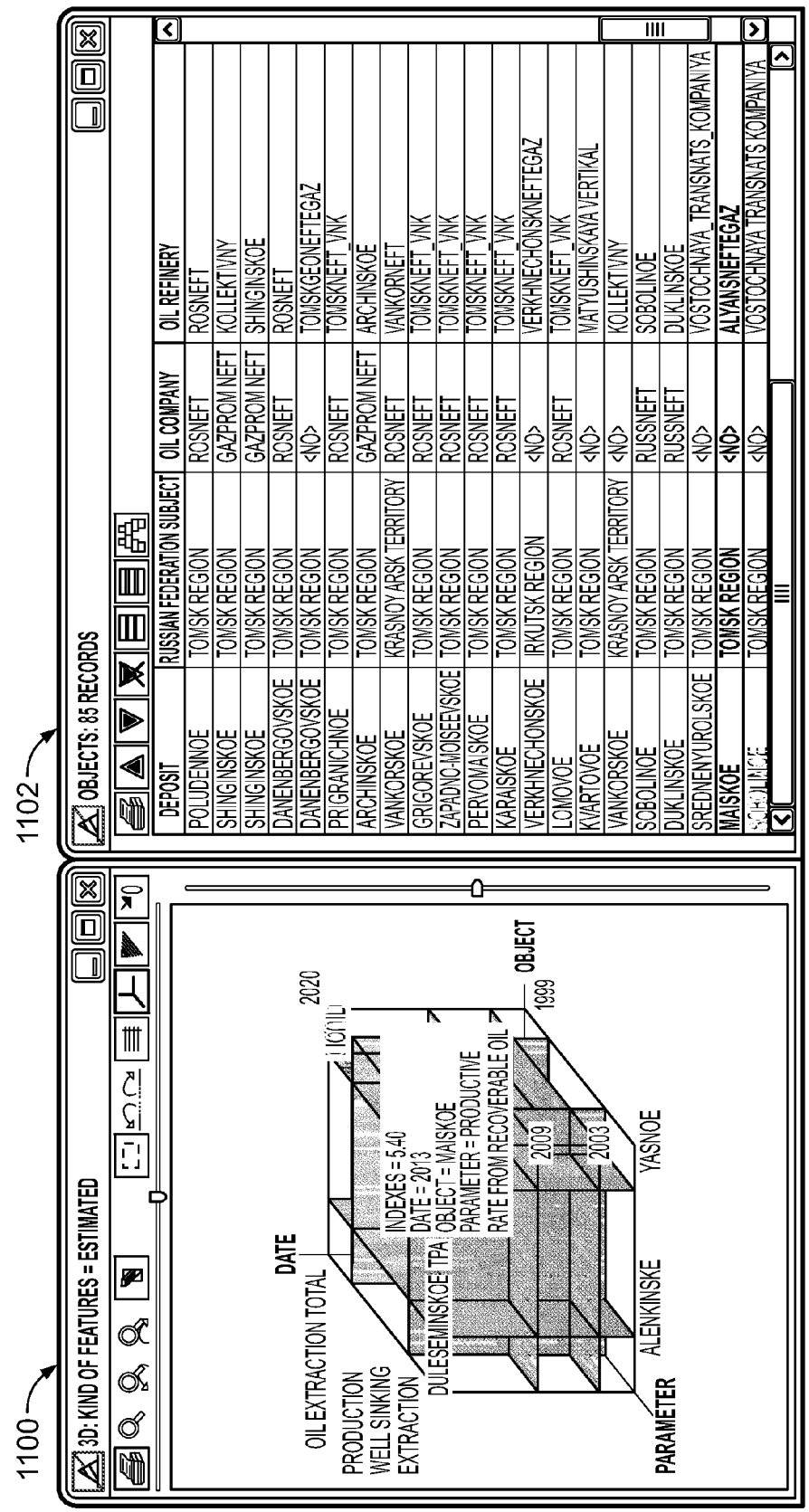
FIG. 11 is a screenshot showing an example of a user interface for displaying and interacting with an object table with a data space showing slices in a data space.

To view an object's parameter value in any point of a slice, a user may perform a selection operation, for example while depressing the left button of a mouse, and having guided its pointer closer to a desired point, then holding down the key "Ctrl" on the keyboard, and moving the mouse a little. This action may be referred to as "touching" a slice. As shown in FIG. 11, in window 1100, in response to a slice touching user action, the system may display values for the data point in a small rectangle as well as the values of co-ordinates of a point. This is also shown in window 1200 of FIG. 12 for different data The system may enable receiving detailed information on the object, which is the value of coordinate of a point, in the various ways. For example, if the window of the objects table is open, then in response to a slice or other element of visualization touching, the line containing the information on the object will be highlighted in a data table as shown in window 1102 of FIG. 11.

Figure 12:
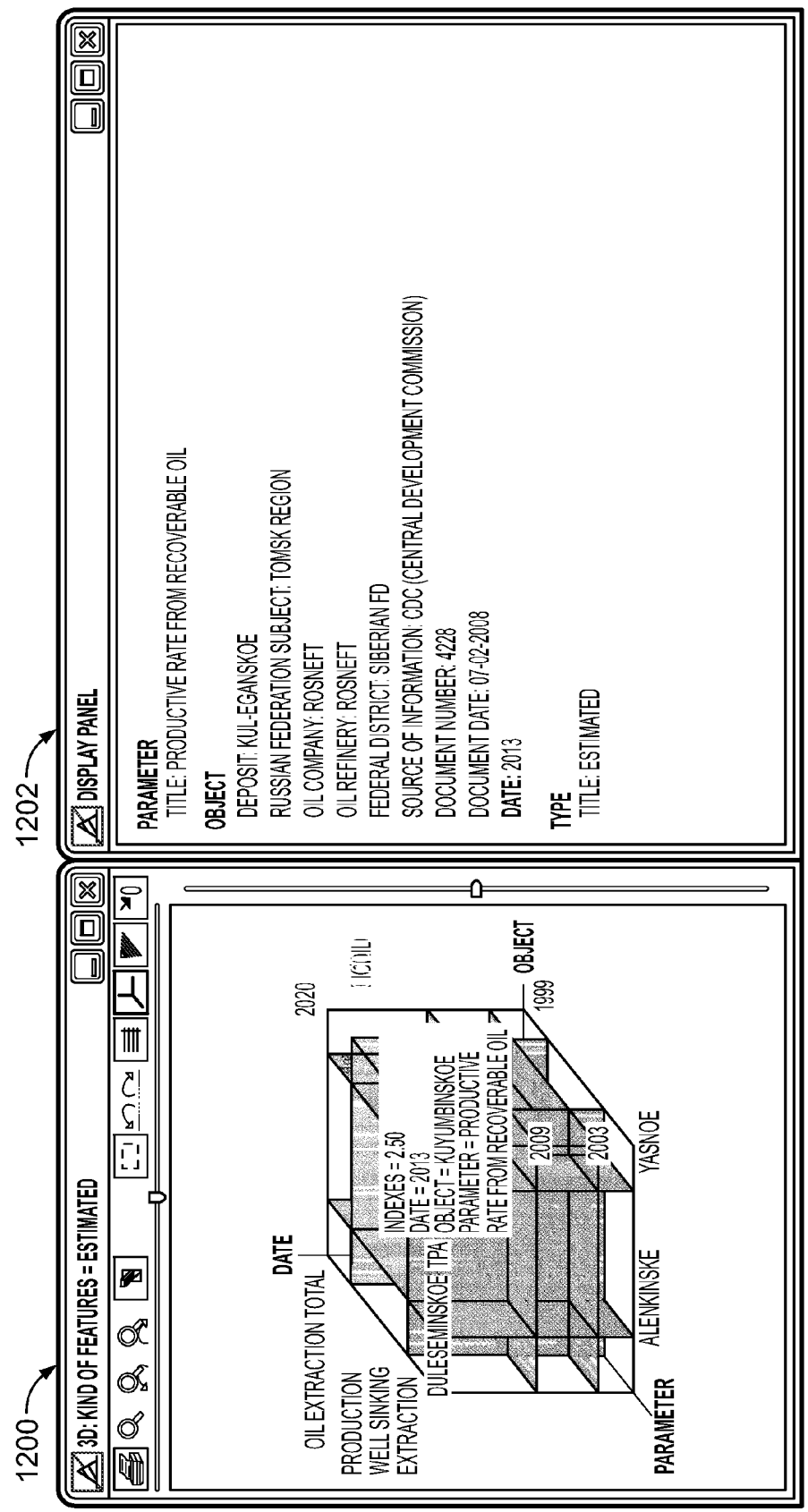
FIG. 12 is a screenshot showing an example of a user interface for displaying and interacting with object and parameter definitions for an extrapolated future slice with a display of a 3-D data space.

In addition, a user may open a special "Information" window 1202 using a menu option or other input, in which window full information on point coordinates is displayed, as shown in FIG. 12.

Data Body

The data body represents a set of conditions on numerical data loaded into a data space. As this data contains values of parameters of a different nature and units of measure it is advantageous to formulate visualization rules using data normalization. That is why the body may be defined in the program using rules applied to color-mapping. Rather than the parametrical filter these conditions filter not objects but the cube's points.

Body visualization may be performed in the 3-D window 1300 in the form of surfaces of conditions (borders of conditions) infringement, as shown in FIG. 13. The window 1300 may be used for adjustment of body parameters. If these parameters are already set, the body itself will be displayed in the 3-D window. Adjustment of the body parameters may comprise defining a condition of a body, which is made similarly to filtrations of the data in a palette window, that is by "cutting" of the values intervals using a pointer or the like as shown in the window 1304.

After finishing an adjustment of the body conditions may apply the changes and cause the system to calculate an updated visualization. The body 1302 may be represented using cubes or quadrangular volumes of different color, each of which represents a cube point, for which the body condition is satisfied and which is painted according to the selected rule of color mapping. To delete a body from the 3-D window a user may select the corresponding item in its shortcut menu bar.

Slice Window

Data displayed in a slice may be viewed in more detail using 2-D representations, referred to herein as a "slice window" or "slice table" respectively. In response to selecting different slice data with the mouse or other pointer in a 3-D window, the data in these 2-D windows may be automatically updated to display the data located on the current slice. When closing the slice the 2-D windows opened for it may automatically be closed. The same may be performed for all 2-D windows at 3-D window closing.

Figure 14:
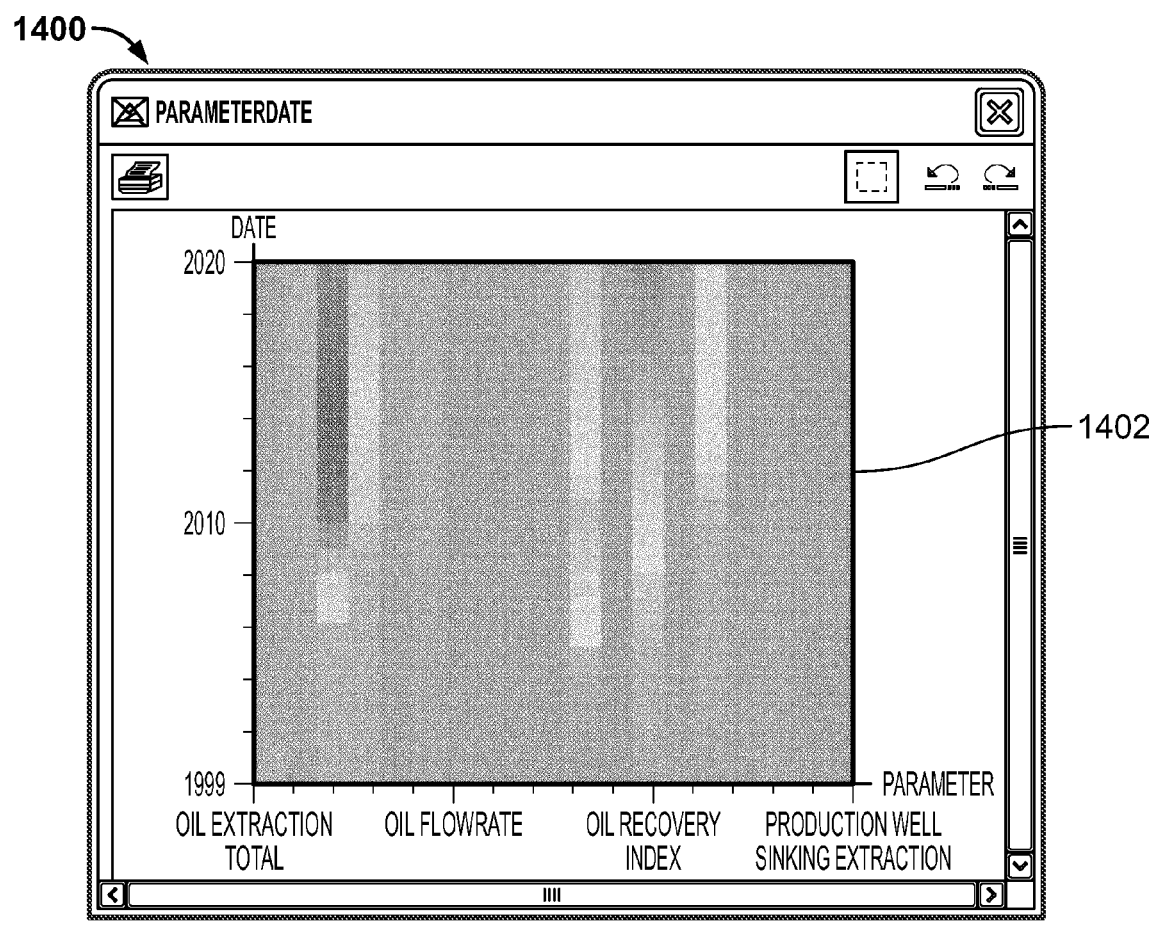
FIG. 14 is a screenshot showing an example of a user interface for displaying an interacting with 2-D slice from the 3-D data space shown in FIG. 13.
Figure 16:
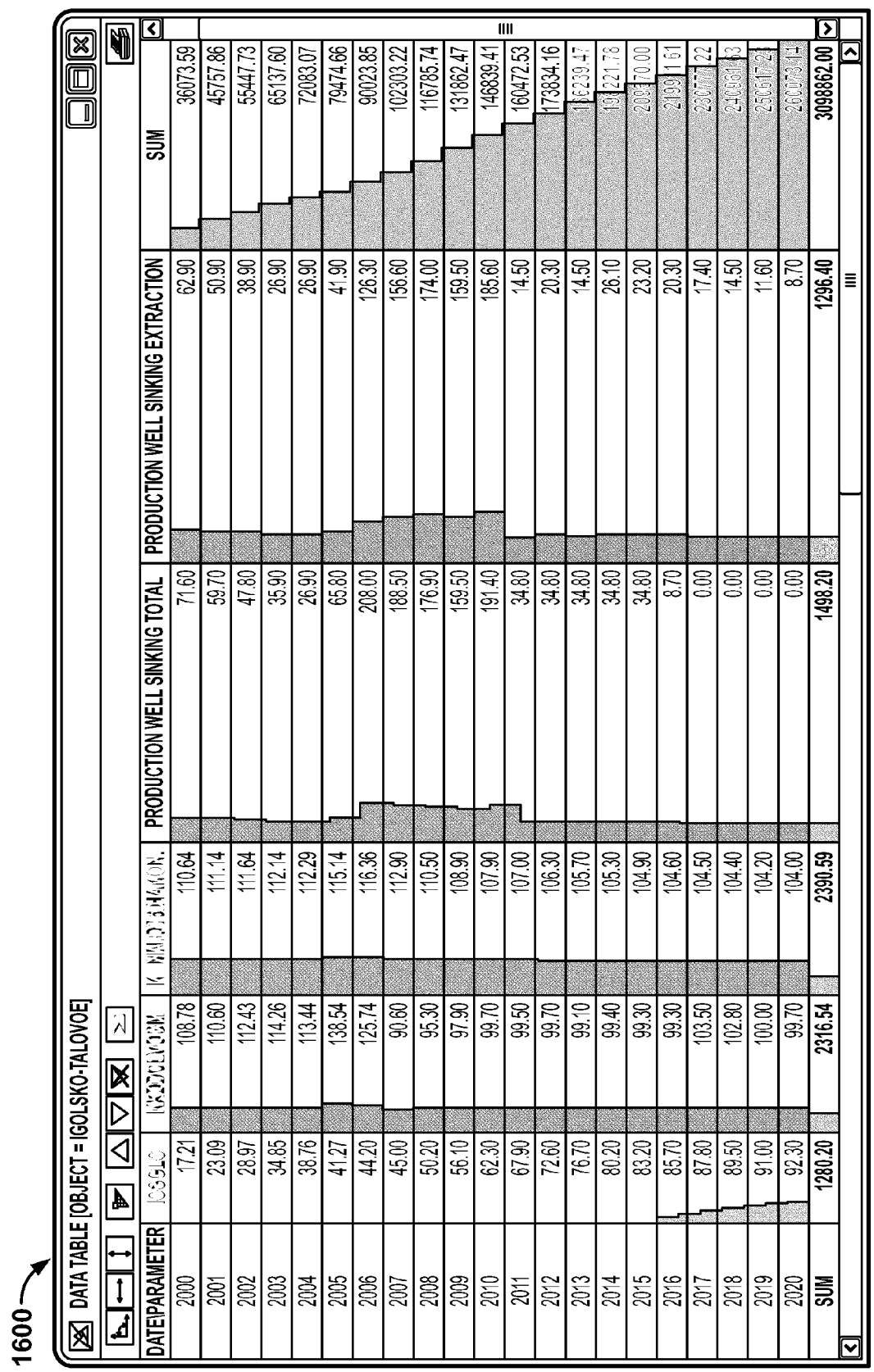

To open a slice window, a user may execute a so-called "grasping and throwing" of the slice on working area of an application window. The system may cause a window 1400 to open in a point where the mouse button has been released, as shown in FIG. 14, in response to defined user input. For example, a user may move the mouse from a part of a windows desktop, having pressed the right button of the mouse on the slice, i.e. having seized it, and then releasing the right button of the mouse, to open a slice window.

In this slice window 1400, the data may be represented using color mapping in a region 1402. Here a user may carry out enlargement (zooming) highlighting a rectangular area in a window, preliminary having pressed the corresponding button of the tool bar of the window. Receiving the information about the exact point of the window may be performed similarly by "touching" with the mouse.

If windows of slices perpendicular to each other are open a user may seize and throw one of them on another using the mouse (or throw the slice on the window of the slice perpendicular to it). As a result a line of their crossing will appear in the window. Grasping and moving the said line with the mouse a user may realize the slices moving.

Slice Table

Another method of data presentation in a 2-D form is a slice table. This window allows simultaneous viewing of numerical values of parameters and their color-mapping depending on the selected coding. Color mapping percentage painting of cells of the table by the coded characteristic may also be used. A first example of a slice table is presented in window 1500 of FIG. 15. A second example is presented in window 1600 of FIG. 16.

Using a slice table window 1500, 1600 the system may enable an exchange of axes, change of the axes direction, switching color mapping on and off, sorting on cube axes, or summation in response to user selection of corresponding buttons of the tool bar of the table window. Window 1600 shows a result of selecting a summation operation in the right-most column.

In the window heading the system may display the value of the coordinate on an axis crossed by the slice at a point of the axis crossed by the slice, and in the table column and line headings the system may arrange the values upon two other axes of a the data space.

To interchange the axes position in the table a user may select a first left button on the tool bar of this window. In response to releasing this button the system may cause the axis to return to original positions. The next two buttons allow changing direction of columns and lines of the table, accordingly, to the contrary. The fourth button switches on and off the color-mapping display of the data. The next three buttons allow realizing operations of the data sorting and will be considered in detail below. And, at last, the eighth button (indicated by a summation symbol) allows the user to view the total data for all columns and lines.

Data Viewing in the Form of Graphs

Figure 17:
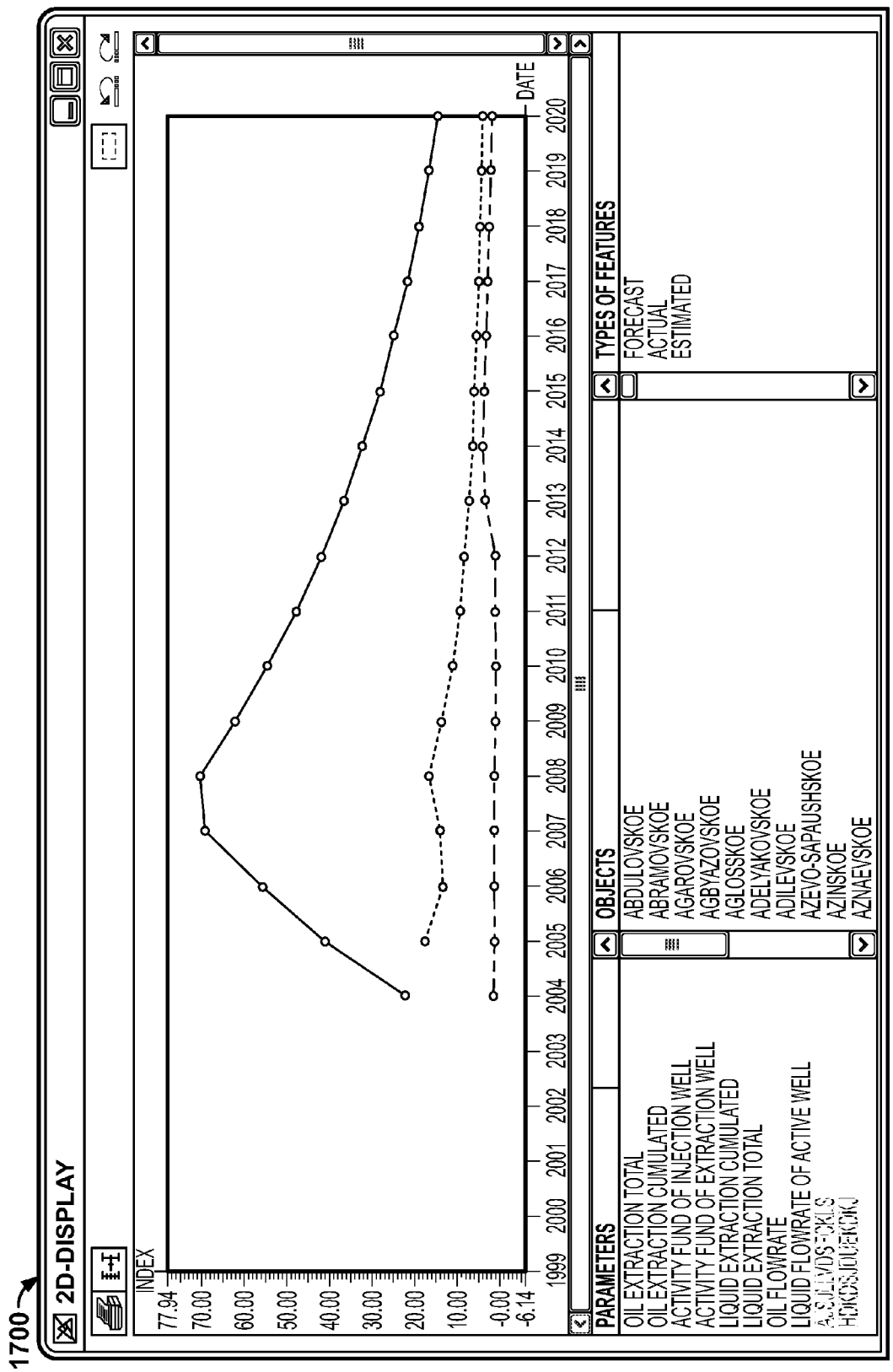
FIGS. 17 and 18 are screenshots showing examples of a user interface for generating and interacting with charts using system data values.
Figure 18:
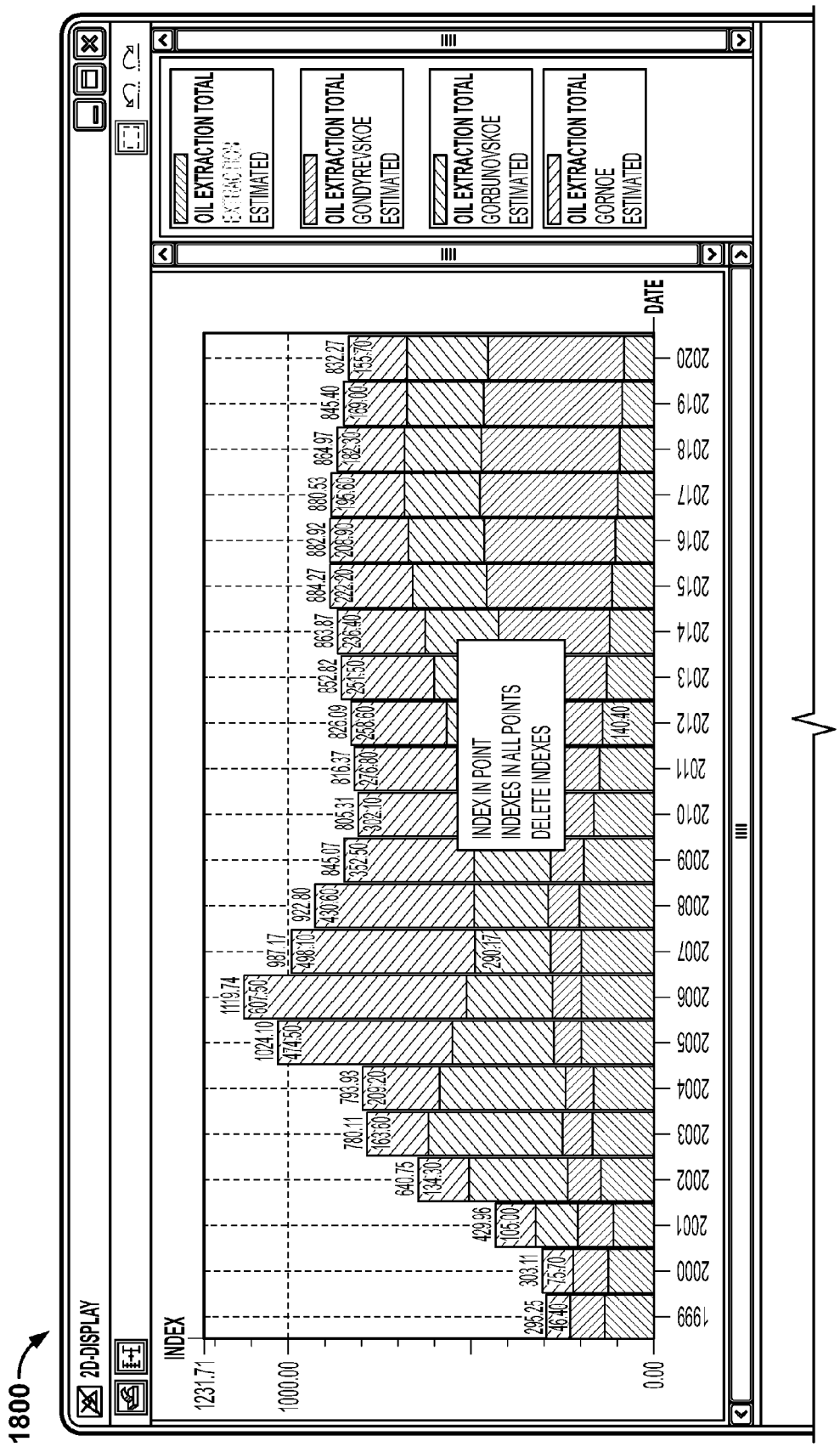
Figure 18:
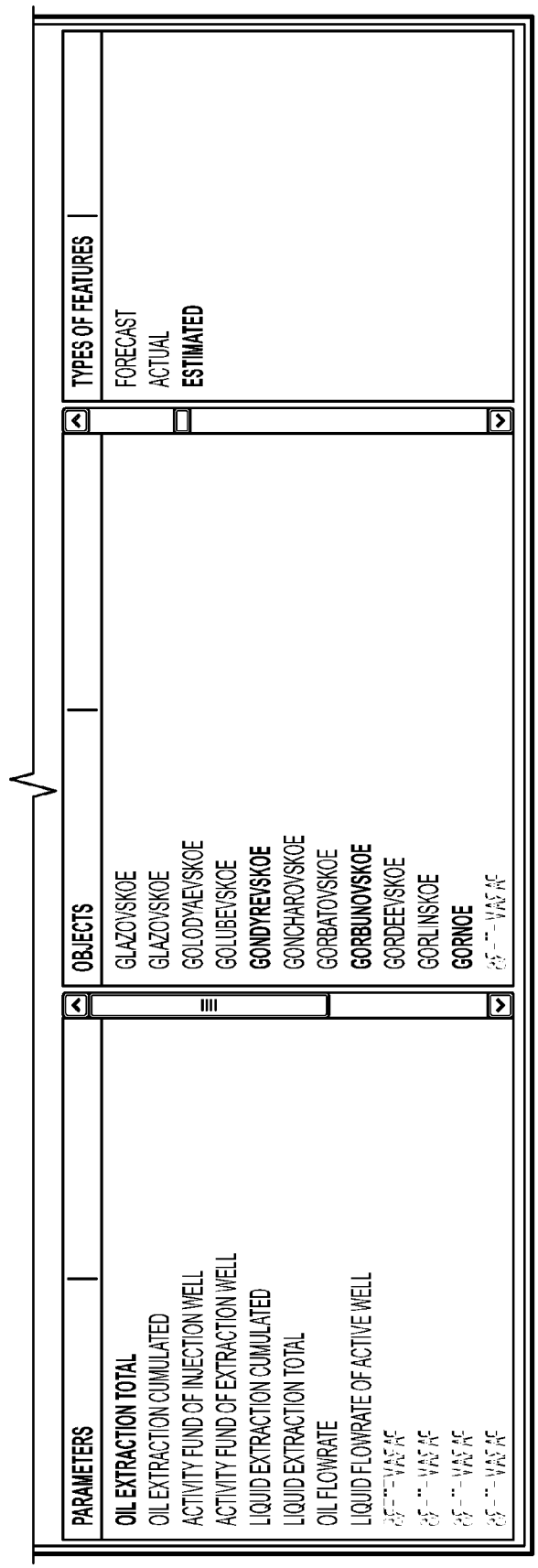

The system may enable viewing of the loaded data in the form of graphs of dependence on time. Examples are shown in window 1700 of FIG. 17 showing a line chart, and window 1800 of FIG. 18 showing a bar chart.

Such windows may comprise two basic sections. A first section may display a graph, shown in the upper portion of the examples 1700, 1800, and the second section displays lists of parameters and objects for user selection, shown in the lower portion of the examples.

Lists of parameters and objects in the second section for selecting may be under the influence of all earlier described filters. Except for filtered out attributes, the lists of data attributes, if any, may be arranged here. To display the graphs a user may select at least on one element in each of the lists of the second section. Selecting in the lists may be performed similarly to selecting in the windows of objects and parameters tables. Color of curves may be appointed automatically on the fixed palette of colors. To change a palette a user may operate on a window "Palette" (not shown) which opens at selecting the main menu option "Windows.Palettes".

In the section of graphs in the upper portion of windows 1700, 1800 a user may conduct zooming for example by selecting the corresponding button "Zoom" located in the right part of the tool bar of a window. To zoom a part of the window a user may highlight the corresponding rectangular area with the mouse. At dropping the mouse the said area will occupy all the section of graphs. Re-turn to the previous condition may be realized by the next button "Cancel", and returning again to the selected zooming may be realized by the button "Return".

To the right of the window printing button there is the button "Parameters", pressing on which opens a window of options of the curves display. In this window a user may select the type of a scale of values—"Linear" or "Logarithmic", to select the mode of the grid display, to set a kind of the data display—either in curves or in histogram, to switch on/off the legend display and to choose its arrangement, to set thickness of a line and the size of points.

The normalization mode means that values of all displayed curves will be normalized on the general scale with borders from 0% to 100%. If this mode is switched off the borders of a scale of values are automatically calculated upon all the set of displayed curves. These borders can also be set manually, having specified their exact values. A user may also fix the borders of a scale of values so that they will not be updated automatically.

The legend allows defining data, which is displayed by a curve (a histogram column), on this curve (a histogram column) color. If the mode of grouping of the legend is switched on than descriptions of the data will be grouped with purpose to reduce the number of repeating names. Real values, both of curves and histograms may be seen by touching with the mouse, and also by selecting the corresponding option of the shortcut menu bar of the curve (histogram).

Sorting of Objects

The sorting of lines in a table of objects may not necessarily cause the system to sort objects on the corresponding axis of a cube. To change an order of arrangement of objects in cube a user may use one of two ways arranging objects in ascending order (decrease) of parameter values: sorting using slice tables and sorting using slices crossing.

To realize sorting of objects using the slice table, a user may use the sorting buttons on the tool bar of the window of the table containing objects either as lines, or as columns. The first two buttons may be used to define the sorting direction, and the third one to define the sorting cancellation. Having chosen a sorting direction by clicking on the corresponding button a user may click on the column heading (if objects are set by lines of the table), or on the line heading (if objects are set by columns). For example, to order deposits on increase of parameter values "Operating wells liquid rate" for 2007, a user may click the heading of a column "2007" with the left button of the mouse after pressing the first of three buttons (sorting on increase).

The ordered column may be displayed in the table with a mark of corresponding sorting in the heading. Streamlining as it has already been described may be simultaneously realized on the axis of objects of the data cube as well. The set sorting may be dynamic in the sense that in response to slice moving with the mouse the order of objects may change continuously supporting the selected sorting.

Sorting under crossing of slices may be executed directly in the 3D window. It should be apparent that selection of a column or a line for sorting in the slice table actually means selecting of two slices crossing. Namely, in the last example of the previous section selecting of the column "Operating wells liquid rate" in the table for sorting is similar to selecting of crossing the slice of the table with another slice located on the axes "Parameters" in the point of "Operating wells liquid rate". Accordingly, another method of sorting the objects provided in the program consists in selecting of corresponding point of the shortcut menu bar of the slice at its activation in points of intersection with another slice.

Dynamism of the sorting set in such a way is already provided with moving of both slices, which form crossing. If sorting is defined then the option "Sorting" in the shortcut menu bar of the slice may be highlighted or flagged and the user may select the highlighted object to cause cancellation of sorting.

Aggregation Operations

Aggregation operations are operations such as, for example, summation realized for a group of objects. The program provides two methods for performance of such operations. They are grouping and drill-down.

Figures 19, 20:
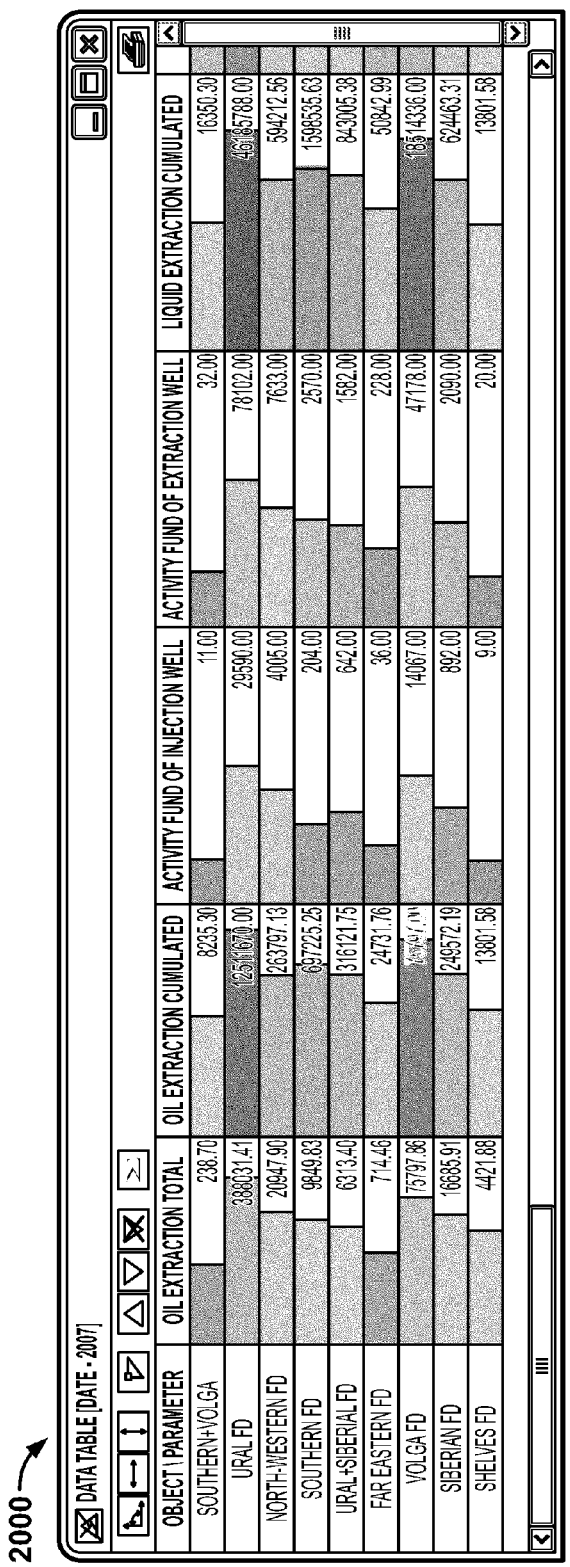
FIG. 19 is a screenshot showing an example of a user interface for defining a data group and numerical operation for system data.
FIG. 20 is a screenshot showing an example of a user interface for displaying results of a numerical analysis of system data.

Grouping in the program means summation on groups of the objects formed by values of characteristics of objects. For example, summation of the data on deposits for each federal district, summation of salaries of employees on their gender or nationality. To perform the grouping operation a user may open a window 1900 of grouping as shown in FIG. 19. The grouping window 1900 may contain a list of characteristics of objects, in which a user may highlight the necessary one and to press button "Apply".

In response to selection of a grouping characteristic, the system may perform first calculation of total values, then instead of names of the objects on the axis in the cube display the names of values of the selected characteristic, and use the sums or other aggregation as values of the displayed 3-D data space. The window 2000, as shown in FIG. 20, shows a summation detail in tabular form for a selected group "Federal District." A user may return to a usual mode of values of the data space by clicking the button "Restore" in the grouping window.

The drill-down procedure may be understood as a hybrid of grouping and hierarchical filtering. Drill-down may be performed in the 3-D window and include the use of four special buttons on the tool bar or other user input. First the drill-down mode should be switched on to enable this procedure, using a window button or other input. When the drill-down mode is switched on the grouping under the characteristic set as first in options of the hierarchical filter is performed. That is, there is a summation on the uppermost level of classification.

If a user sees features among total values of the cube on the slice than there is a desire to understand in more detail, a user may request a "detail" the data he is interested in. To pass on the following level of detailing a user may select a first button "Drill-down" and to "brush" using the mouse in the point of the slice where the features were found. The hierarchical filter on value of the characteristic selected by the mouse will be set, and summation on the following level of hierarchy defined in options of the hierarchical filter will be performed.

Data Transformation

The loaded data may be subjected to various transformations using division in slice or crossing of slices, and calculations on their basis of the derivative data, for example using a window "2D-Calculator" (not shown).

Slice division allows "associating" all data of the data space with the data with the fixed coordinate of a point. For example, division in slice crossing an axis of parameters allows viewing the data in relation to the fixed parameter. Division in slice crossing an axis of objects allows comparing the data with the data of the exact object. Division in slice located on the date axis allows associating the data with the data for certain date.

This operation may performed for example in response to user selection of an option "Divide in slice" of the shortcut menu bar of the slice in the 3D window. Upon selecting this action all values of the data cube may be shared on values in projection points on slice. If at activation of the shortcut menu bar the mouse pointer has touched on a crossing of two slices the option "Divide into crossing" may be accessible. Division into values in points of projections to the slices crossing line will be executed. Return to the initial data may be accomplished in the shortcut menu bar of the slice using a option "Restore".

The system may enable calculations of the virtual slice using operations of one direction over slices in the 2-D calculator. In response to selecting the slices of one direction there appear the axes appointed as designations in the formula. Selecting of a slice may be performed by its addition into the list of designations by throwing the slice into this list with the right button of the mouse. Slices of only one direction may simultaneously be selected in the list.

One or more formulas, according to which calculation of virtual slice is per-formed, may be indicated in a formula section of the window. The formula is made of names of the variables incorporated in the list, arithmetic operations signs (+ addition, * multiplication, − subtraction, / division), grouping parentheses, mathematical functions (sin—sine, cos—cosine, tan—tangent, atan—arctangent, exp—exponent, log—the natural logarithm, log10—common logarithm, abs—modulus, sqrt—square root) and logic designs (if-else<>, =, >=<=<> not). For example, if (X>0) {Y/X} else {X/Y}.

Buttons may be provided near the formulas window to allow more convenient forming of it similarly to the case of the parametrical filter. Calculation of the virtual slice may be performed according to the input formula. Results may be presented in a data window displayed using color mapping in the form of a slice table. For this purpose a user may select the corresponding option of its shortcut menu bar, in which a palette window can also be opened.

Method Example

Figure 21:
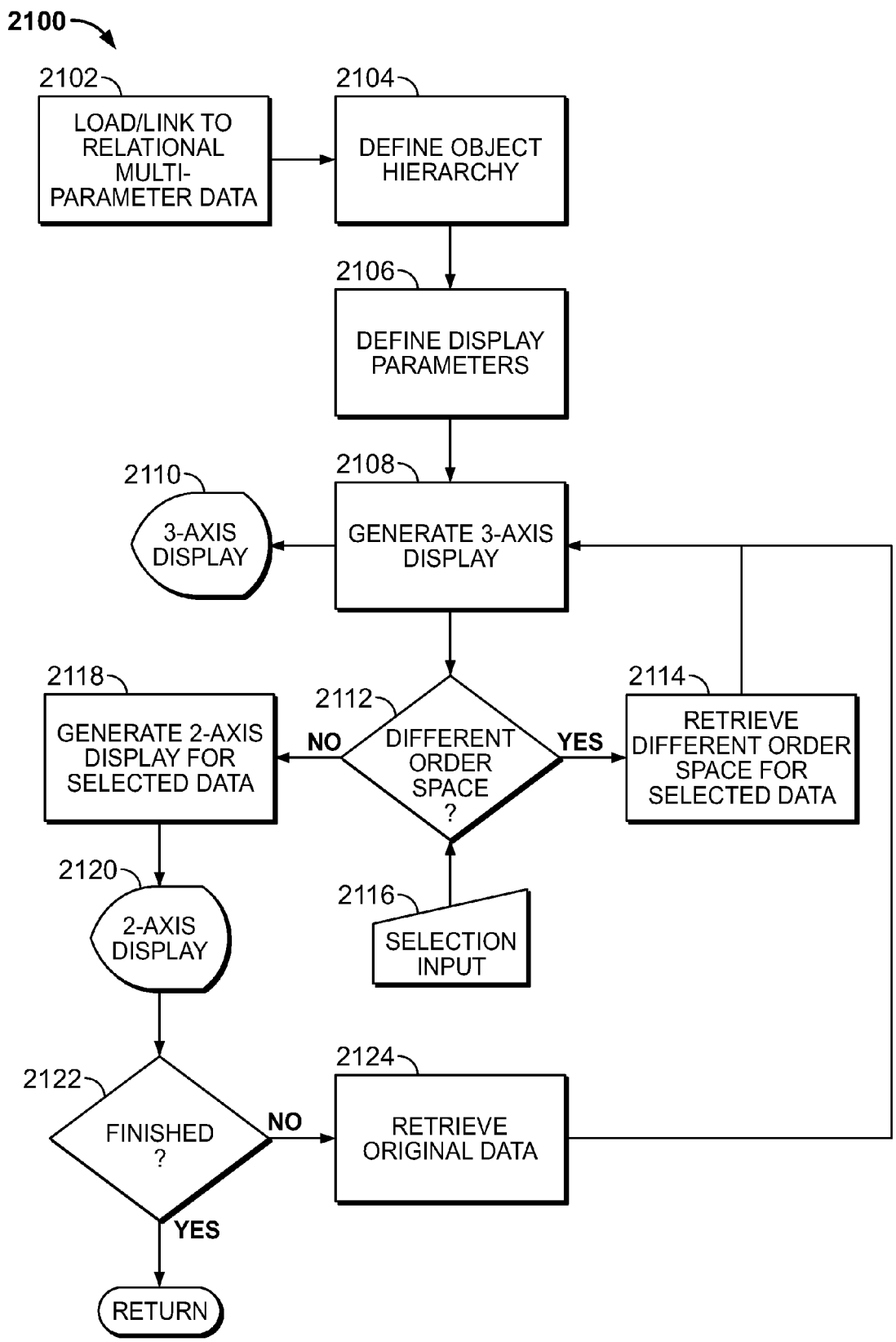
FIG. 21 is a flow chart showing an example of a method for data visualization and analysis.

Consistent with the foregoing, performance of a method 2100 exemplifies aspects of the present technology, as shown in FIG. 21.

At 2102, relational multi-parameter numeric data is loaded or accessed using a computer system, in any suitable manner. As described above, the data is organized into three classifications of object, parameter and time, each corresponding respectively to one axis of a three-dimensional data space. For example, given a particular numeric data value, the system assigns to it a particular time value, parameter label describing what parameter the numeric value describes, and a particular object value describing an object to which the parameter pertains. The data should include numeric values assigned plural time, plural parameter, and plural object classifications. The classifications may be determined by querying a database from which the data is obtained, or by any other suitable method.

At 2104, a system computer defines an object hierarchy for object classifications within the data space. The hierarchy may be defined in response to user input, for example using manual classification by a user. In the alternative, or in addition, the hierarchy may be defined automatically using an algorithm processing data relationships. For example, an object that is assigned to numeric data that is also assigned to two or more other objects may be assumed to be in a higher-order relationship to the other two objects.

At 2106, the system may define display parameters for the data. This may include, for example, filtering or sorting data as described above. Clear examples of filtering, sorting, and other display parameters have been described in the foregoing description.

At 2108, a computer may generate a three-axis display output 2110 from multi-parameter data. The display output 2110 may depict a volumetric data space having three mutually perpendicular axes comprising an object axis, a parameter axis, and a time axis. The display output of the first volumetric space may be generated as an axonometric projection.

At 2114 and 2108, a computer may generate, in response 2112 to user input 2116 selecting a first data point along one of the mutually perpendicular axes associated with a lower-order volumetric data space, a display output depicting the lower-order volumetric data space defined by the first data point and having three mutually perpendicular axes comprising a lower-order object axis, a lower-order parameter axis, and a time axis. This may be understood as retrieving 2114 the lower order data in response 2112 to the selection input 2116 and then generating 2108 a three axis display. The computer may receive the selection input 2116 via a user input device comprising at least one of a touchscreen, a keyboard, and a pointing device.

At 2118, a computer may generate, in response 2112 to user input 2116 selecting a second data point along one of the mutually perpendicular axes that is not associated with a lower-order volumetric data space, a display output 2120 depicting a two-dimensional data slice parallel to any two of the mutually perpendicular axes defined by the second data point. The computer may generate the display output of the two-dimensional data slice as a data table. The computer may generate the display output of the two-dimensional data slice as a color-coded graphical map. The computer may apply a defined mathematical transformation to selected data to generate transformed two-dimensional data slices, in response to user input. The defined mathematical transformation may be selected from: translation of data along the axes of the volumetric data space; summation of slices; comparing of slices by the means of subtraction, division, or multiplication; determining of each slice's relation to a slice having a defined date; determining of ratio between data elements; time differentiation; or parameter differentiation. The computer may generate the display output depicting a two-dimensional data slice responsive to movement of the second data point along one of the mutually perpendicular axes to display successive data slices. Each of the successive data slices may be displayed as a data table or a graph simultaneously with the display output depicting the volumetric data space.

In response to user input, when user interactions are finished 2122, the computer may return to any desired prior state. If user input indicates that the user desires to continue data analysis and visualization, the computer may retrieve an original or prior data configuration 2124 to enable additional data navigation and analysis.

The computer therefore may display, for data having a number of dimensions more than three, a number N of related three or two dimensional data cubes, number N of which is determined by formulas $C_N^2$ and $C_N^3$, where N equals the number of data dimensions and C equals the number of combinations of this number on 2 or 3, respectively. Likewise, the computer may generate a display output of the volumetric data space, the lower-order volumetric data space or the two-dimensional data slice in response to user selection of a data point or region on a two-dimensional geographic map.

Clear examples of the foregoing method steps or procedures have been described in the foregoing specification, from which one of ordinary skill may implement the described method in computer software, hardware, or a combination thereof. Features of the method or the method in it entirety may be encoded as program instructions on a computer-readable medium. When executed by a processor, the instructions may cause a computer or computer system to perform one or more steps of the method. The steps may be performed in any operative order and the order of operation is not limited by the described examples.

General Considerations

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and/or algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes Compact Disc (CD), laser disc, optical disc, Digital Versatile Disc (DVD), floppy disk and Blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method, comprising:
    generating a display output from multi-parameter data using a computer, the display output depicting a volumetric data space having three mutually perpendicular axes comprising an object axis, a parameter axis, and a time axis;
    generating, in response to user input selecting a first data point along one of the mutually perpendicular axes associated with a lower-order volumetric data space, a display output depicting the lower-order volumetric data space defined by the first data point and having three mutually perpendicular axes comprising a lower-order object axis, a lower-order parameter axis, and a time axis;
    generating, in response to user input selecting a second data point along one of the mutually perpendicular axes that is not associated with a lower-order volumetric data space, a display output depicting a two-dimensional data slice parallel to any two of the mutually perpendicular axes defined by the second data point; and
    displaying, for data having a number of dimensions more than three, a number of related 3- (or 2-) dimensional data cubes, the number being determined by formulas $C_N^2$ and $C_N^3$, where N equals the number of data dimensions and C equals the number of combinations of this number on 2 or 3, respectively.

2. The method of claim 1, wherein the computer generates the display output of the volumetric space as an axonometric projection.

3. The method of claim 1, further comprising generating the display output of the two-dimensional data slice as a data table.

4. The method of claim 1, further comprising generating the display output of the two-dimensional data slice as a color-coded graphical map.

5. The method of claim 1, further comprising applying a defined mathematical transformation to selected data to generate transformed two-dimensional data slices, in response to user input.

6. The method of claim 5, wherein the defined mathematical transformation is selected from: translation of data along the axes of the volumetric data space; summation of slices; comparing of slices by the means of subtraction, division, or multiplication; determining of each slice's relation to a slice having a defined date; determining of ratio between data elements; time differentiation; or parameter differentiation.

7. The method of claim 1, wherein the computer receives the user input via at least one user input device selected from a touchscreen, a keyboard, a pointing device, a camera, a motion tracking device, or a microphone.

8. The method of claim 1, further comprising generating the display output depicting a two-dimensional data slice responsive to movement of the second data point along one of the mutually perpendicular axes to display successive data slices.

9. The method of claim 8, wherein each of the successive data slices is displayed as at least one of a data table and graph simultaneously with the display output depicting the volumetric data space.

10. The method of claim 1, further comprising generating a display output of the volumetric data space, the lower-order volumetric data space or the two-dimensional data slice in response to user selection of a data point or region on a two-dimensional geographic map.

11. An apparatus comprising a memory holding instructions for:
generating a display output from multi-parameter data depicting a volumetric data space having three mutually perpendicular axes comprising an object axis, a parameter axis, and a time axis;
generating a display output depicting a lower-order volumetric data space defined by a first user-selected data point and having three mutually perpendicular axes comprising a lower-order object axis, a lower-order parameter axis, and a time axis in response to user input selecting the first data point along one of the mutually perpendicular axes;
generating, in response to user input selecting a second data point along one of the mutually perpendicular axes that is not associated with a lower-order volumetric data space, a display output depicting a two-dimensional data slice parallel to any two of the mutually perpendicular axes defined by the second data point;
displaying, for data having a number of dimensions more than three, a number of related 3- (or 2-) dimensional data cubes, the number being determined by formulas $C_N^2$ and $C_N^3$, where N equals the number of data dimensions and C equals the number of combinations of this number on 2 or 3, respectively; and
a processor that executes the instructions.

12. The apparatus of claim 11, wherein the memory holds further instructions for generating the display output of the volumetric space as an axonometric projection.

13. The apparatus of claim 11, wherein the memory holds further instructions for generating the display output of the two-dimensional data slice as a data table.

14. The apparatus of claim 11, wherein the memory holds further instructions for generating the display output of the two-dimensional data slice as a color-coded graphical map.

15. The apparatus of claim 11, wherein the memory holds further instructions for applying a defined mathematical transformation to selected data to generate transformed two-dimensional data slices, in response to user input.

16. The apparatus of claim 15, wherein the memory holds further instructions for applying the defined mathematical transformation selected from: translation of data along the axes of the volumetric data space; summation of slices; comparing of slices by the means of subtraction, division, or multiplication; determining of each slice's relation to a slice having a defined date; determining of ratio between data elements; time differentiation; or parameter differentiation.

17. The apparatus of claim 11, wherein the memory holds further instructions for, receiving the user input via at least one user input device selected from a touchscreen, a keyboard, a pointing device, a camera, a motion tracking device, or a microphone.

18. The apparatus of claim 11, wherein the memory holds further instructions for generating the display output depicting a two-dimensional data slice responsive to movement of the second data point along one of the mutually perpendicular axes to display successive data slices.

19. The apparatus of claim 18, wherein the memory holds further instructions for displaying each of the successive data slices as at least one of a data table and graph simultaneously with the display output depicting the volumetric data space.

20. The apparatus of claim 11, wherein the memory holds further instructions for generating a display output of the volumetric data space, the lower-order volumetric data space or the two-dimensional data slice in response to user selection of a data point or region on a two-dimensional geographic map.

* * * * *